March 3, 1959 L. R. F. HARRIS 2,876,284
CONTROL UNITS FOR SWITCHING SYSTEMS
Filed Nov. 24, 1954 14 Sheets-Sheet 1
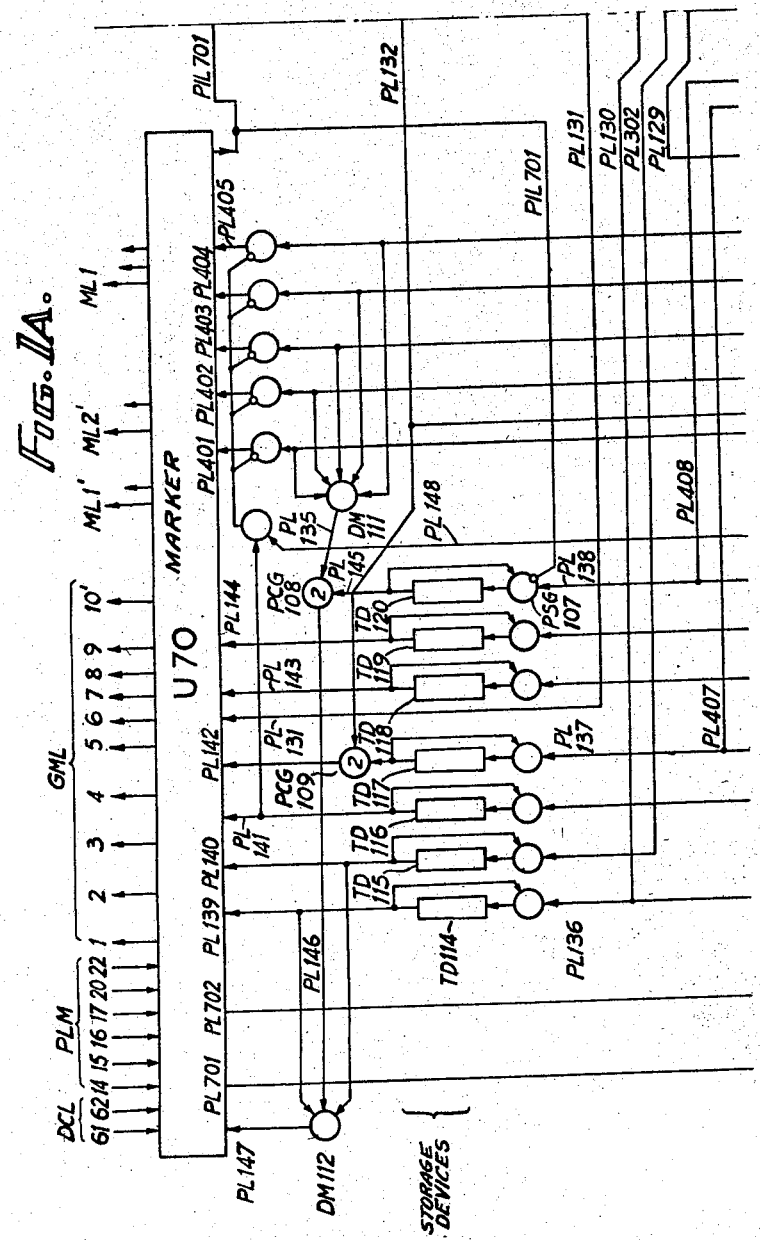
INVENTOR
Lionel R. F. Harris
BY
ATTORNEY

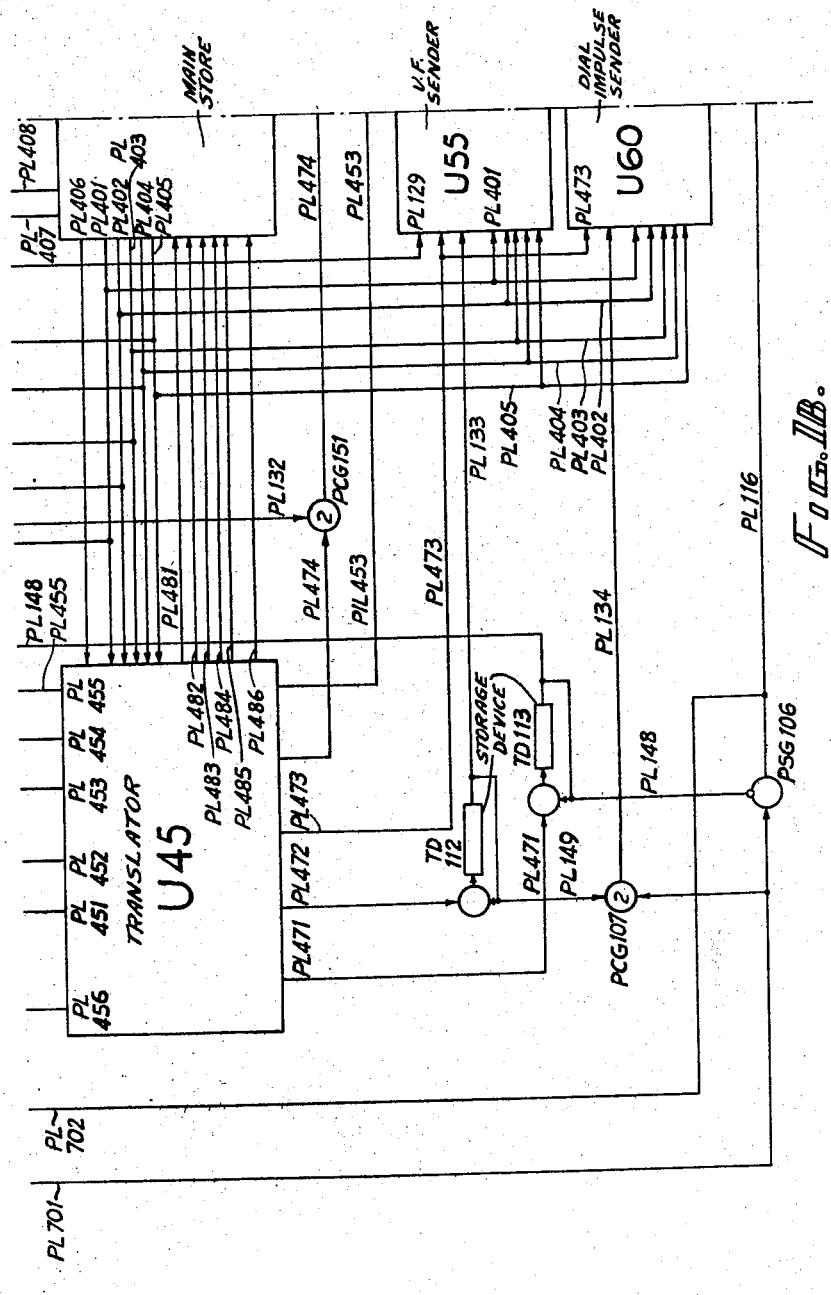
FIG. IIB.

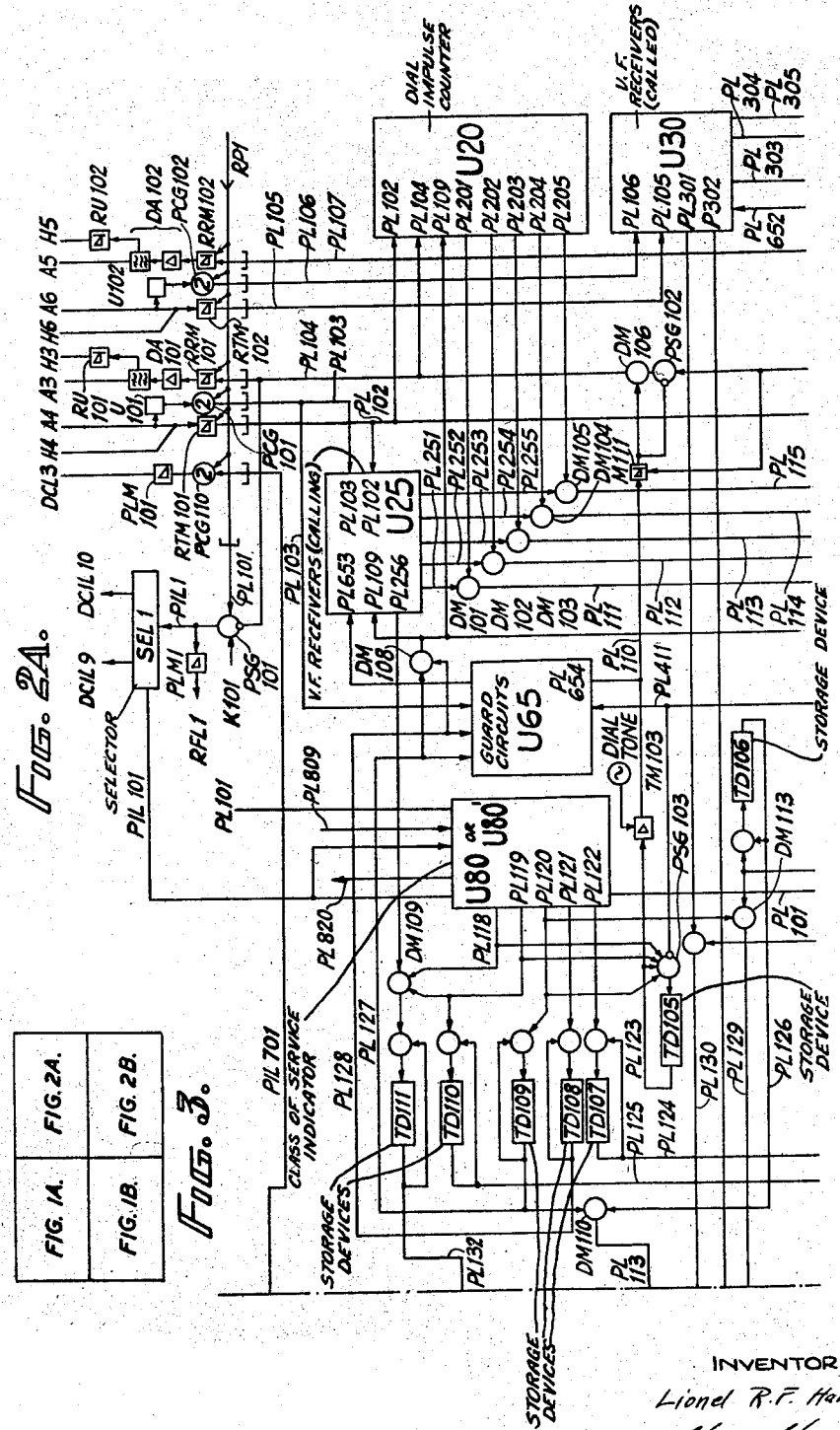

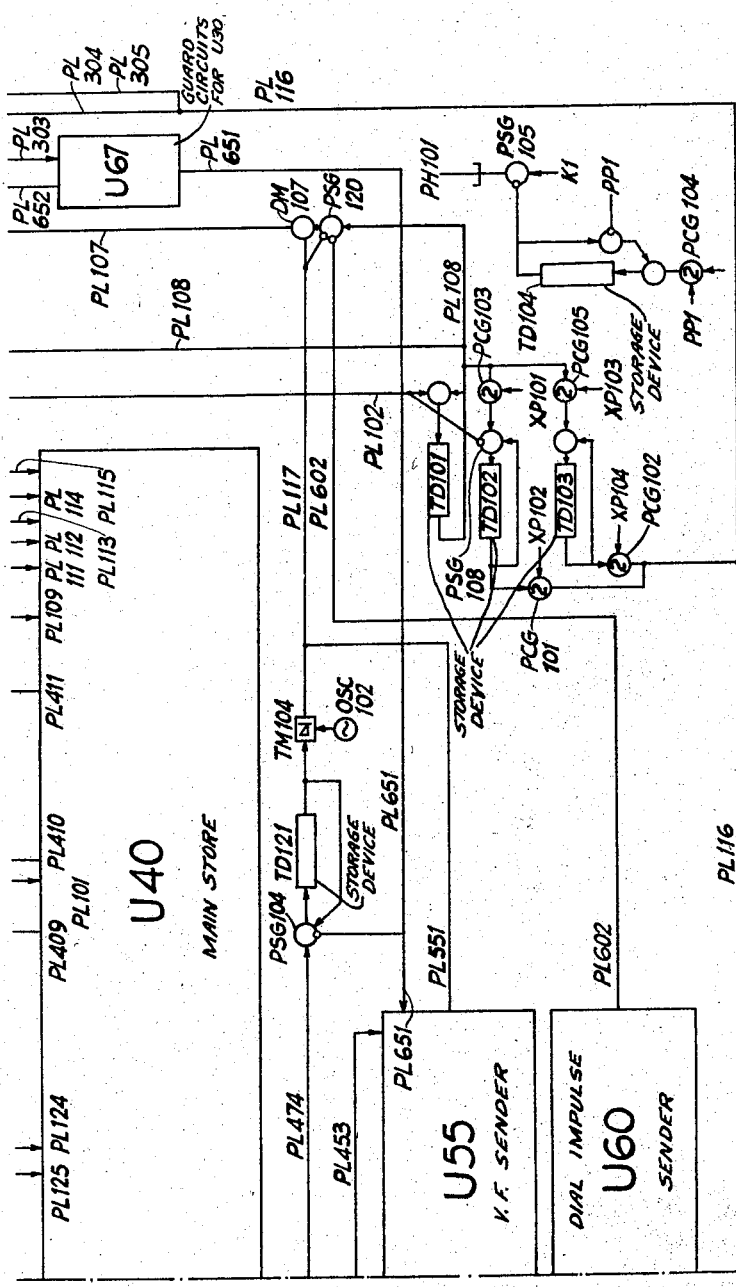

March 3, 1959    L. R. F. HARRIS    2,876,284
CONTROL UNITS FOR SWITCHING SYSTEMS
Filed Nov. 24, 1954    14 Sheets-Sheet 5

INVENTOR
Lionel R. F. Harris
BY
ATTORNEY

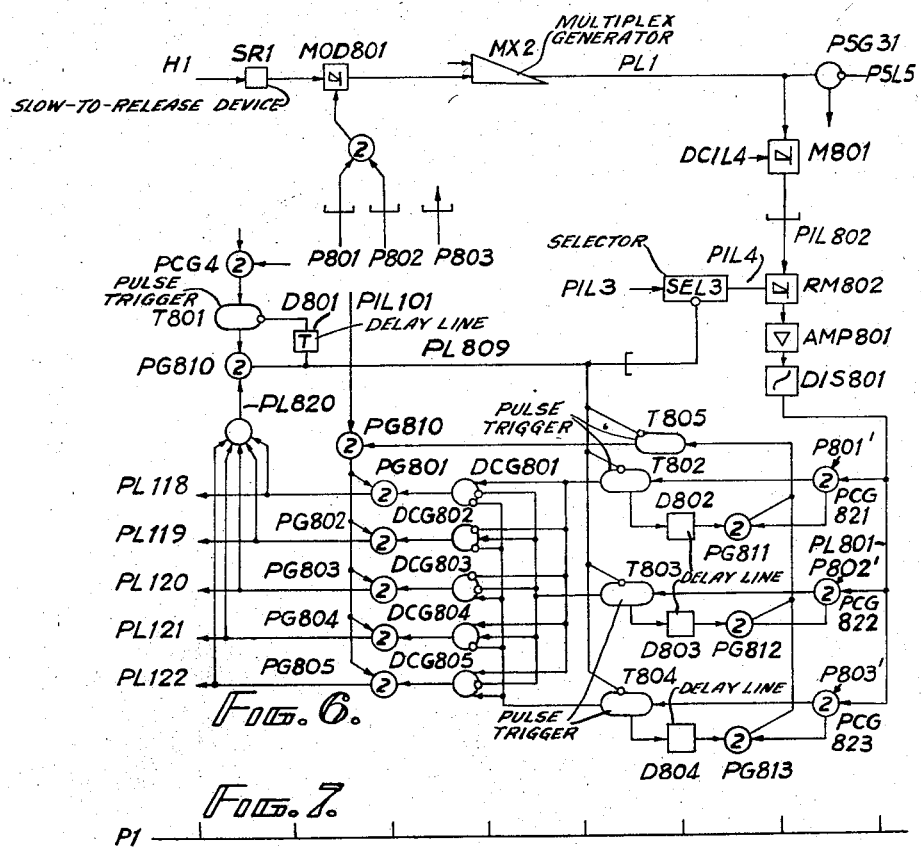
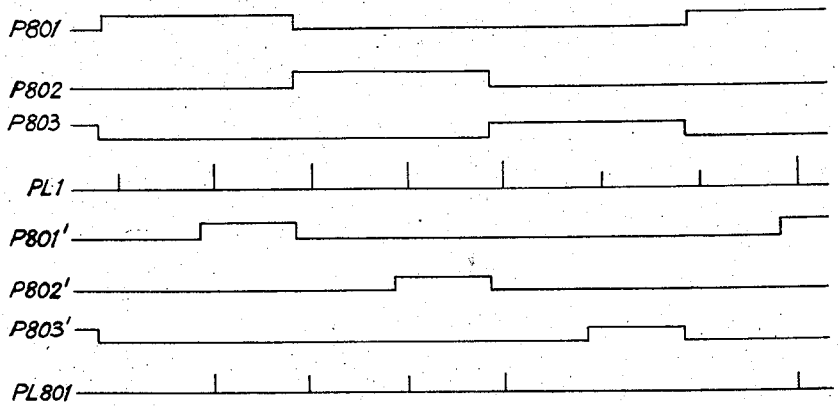

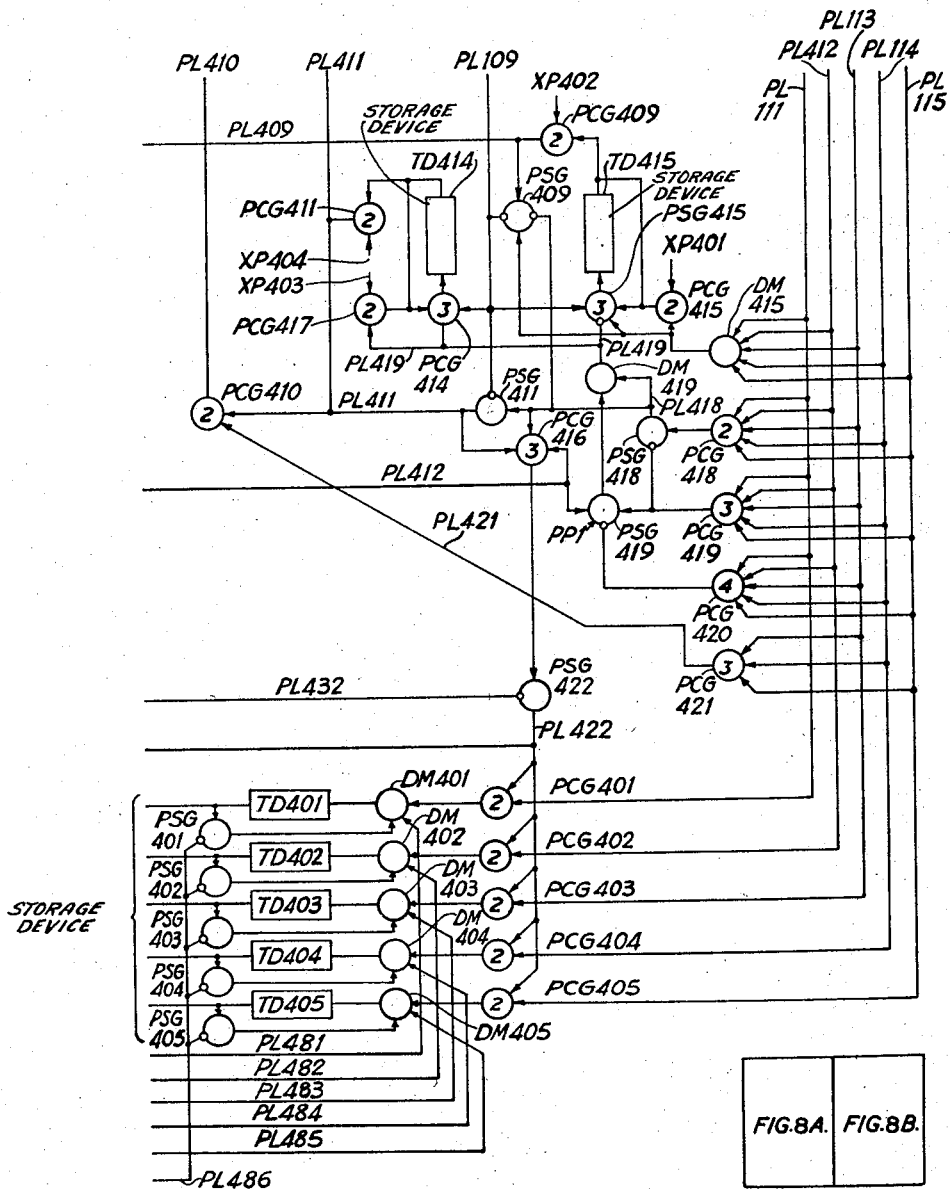

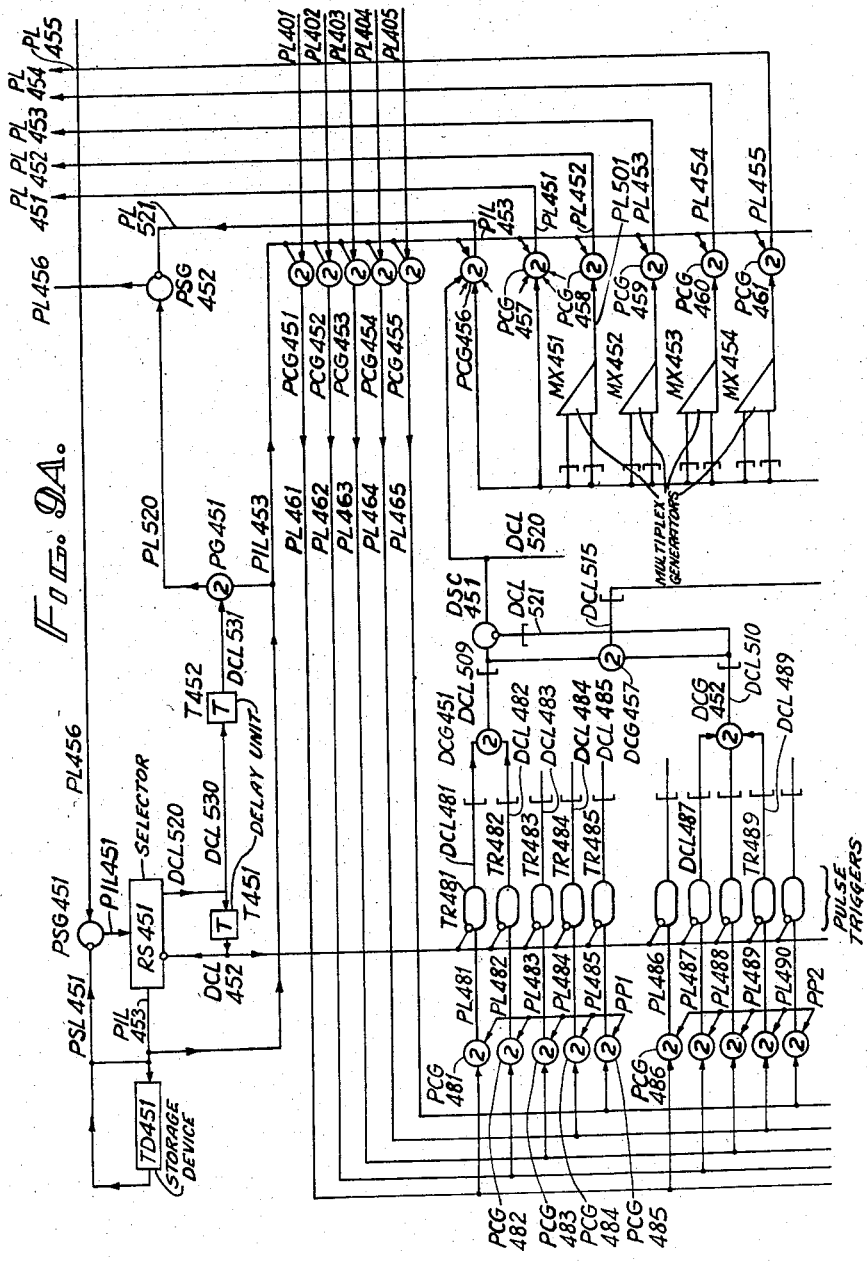

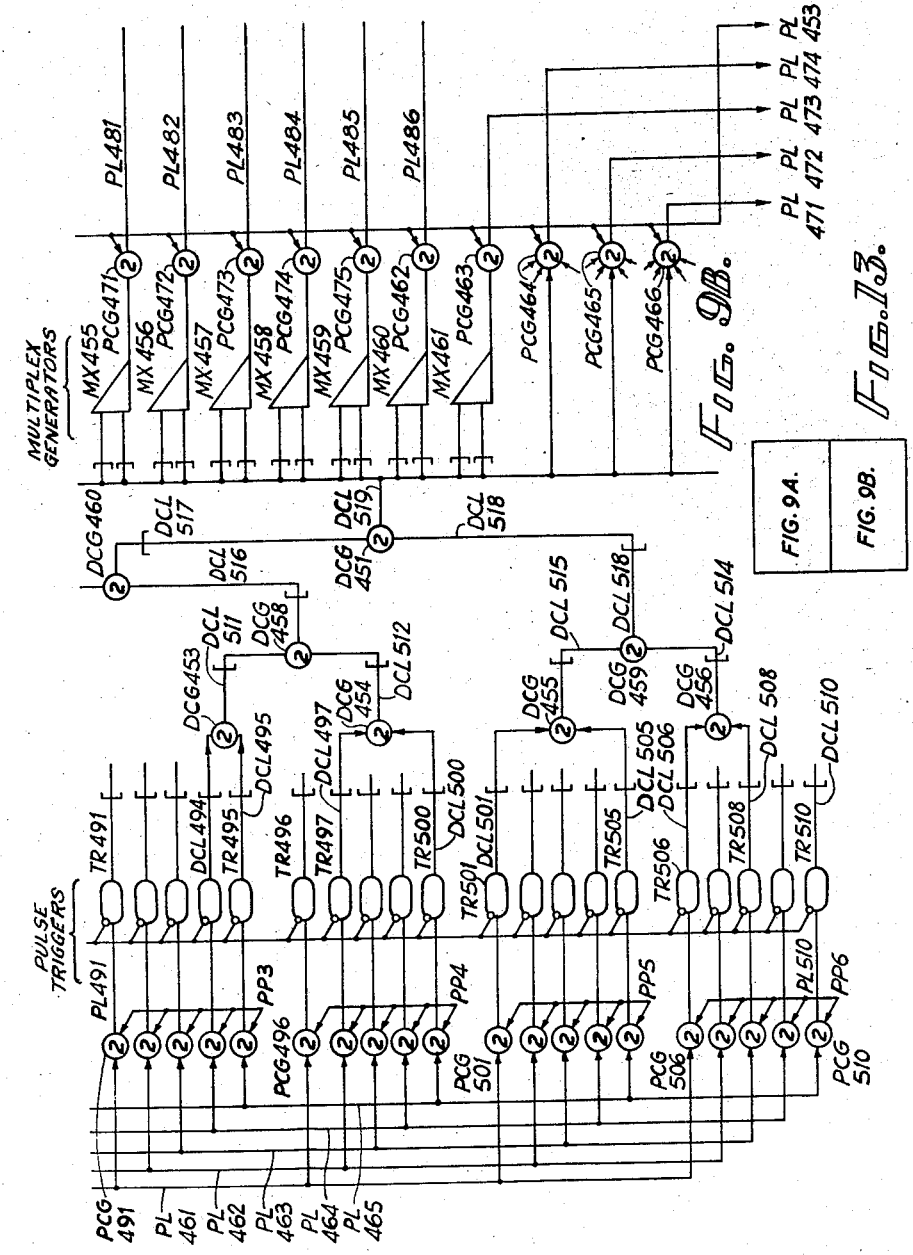

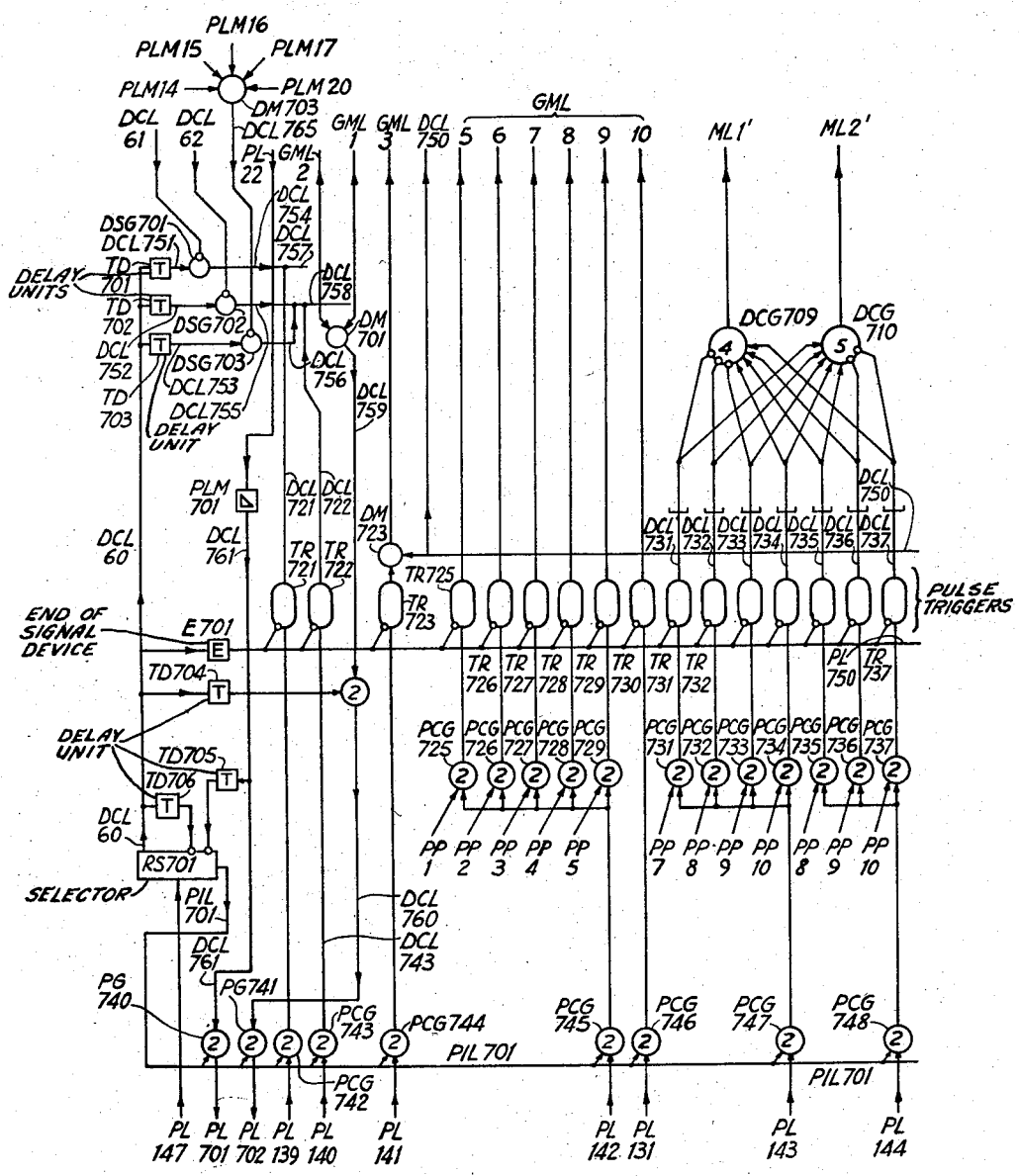

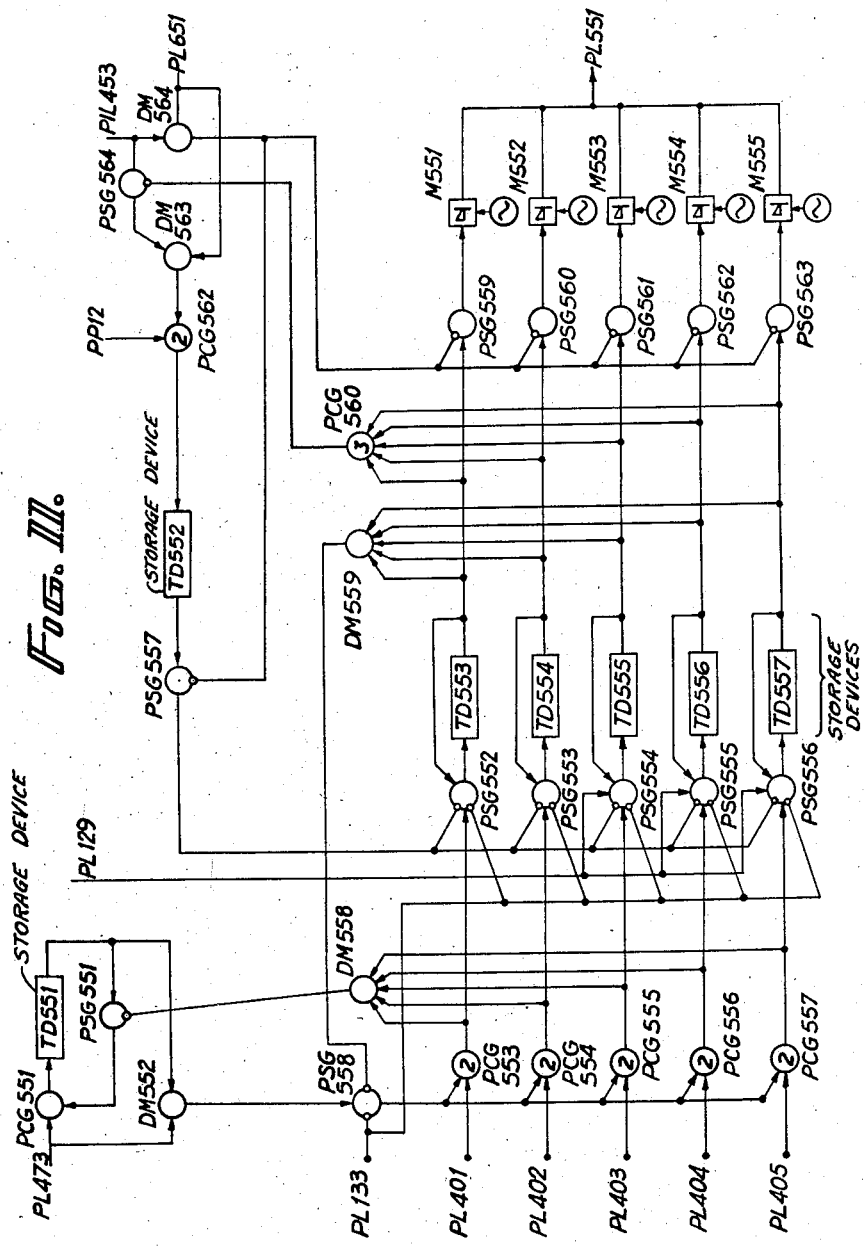

INVENTOR
LIONEL R. F. HARRIS

BY
ATTORNEY

United States Patent Office 2,876,284
Patented Mar. 3, 1959

2,876,284

CONTROL UNITS FOR SWITCHING SYSTEMS

Lionel Roy Frank Harris, Kenton, England, assignor to Her Majesty's Postmaster General, St. Martin's-Le-Grand, London, England Application November 24, 1954, Serial No. 471,073

Claims priority, application Great Britain November 30, 1953

16 Claims. (Cl. 179—15)

This invention relates to the control of switching systems and has particular although not exclusive reference to the control of telephone exchanges in which connection between two circuits is established by first connecting a calling circuit to a free register which receives and stores information from the calling circuit, which information designates the group of one or more called circuits, a free one of which is to be connected to the calling circuit. Registers which perform these and other operations are well known and since they, together with their associated equipment are expensive, it is normal for the registers to be used as efficiently as possible by making each one available for use by any of the whole or of a large proportion of the circuits when they call for a connection. In such cases it is common practice to refer to the registers together with their associated apparatus as common control apparatus even though each register is an individual item of apparatus.

In accordance with the present invention there is provided for a switching system, apparatus to control the setting up of a connection between calling and called circuits of the system in which each connection being set up is allotted a characteristic time in a time cycle, information relating to the connection being conveyed to the apparatus and dealt with thereby at that time.

In one particular embodiment of the invention each connection being set up is allotted a time spaced pulse train which is one of a number of such trains. Information relating to the connection being set up is coded in binary form using the presence and absence of the pulses of the pulse train as symbols.

In embodiments to be described later of this invention the control apparatus includes a single block of common apparatus for a group of registers and, in general, for all the registers required in a telephone exchange, the only exceptional cases being in large exchanges where for practical reasons it may be preferable to use more than one block of such common control equipment. In a block of common control equipment as disclosed in this specification all the information relating to the connections being set up by the block of apparatus performing the functions of a group of registers, is indicated and made available in the common control on leads common to all the connections being controlled. By operating on the signals appearing on these common leads the same operating apparatus may be used to control a number of conections simultaneously instead of having an individual operating apparatus for each register.

Hitherto, time division multiplex (T. D. M.) has been applied mainly to speech communication systems in which a number of connections exist simultaneously on one common channel each connection being allotted a period of time corresponding to a pulse train which is individual to it. In addition T. D. M. may be used for other purposes. It may be used to indicate that particular circuits in a telephone exchange are in a particular state or require a particular operation to be performed on them.

The pulse repetition frequency to be used for the pulse trains and the method of generating the pulses depend on the type of function to be performed. In the case of the selection of one of a number of calling circuits where the detection of one pulse out of a number is sufficient to initiate the set-up of the connection, a pulse repetition frequency (P. R. F.) of 0.1-1 kc./sec. would probably suffice and the pulse indication could be undertaken by a multiplex pulse generator of the type described in U. S. Patent specification No. 2,727,094, granted to T. H. Flowers, S. D. Harper and L. R. F. Harris. For answer tone sending however, and in all similar cases where the function to be performed is the sending of a tone the P. R. F. should be at least twice that of the frequency of the tone to be sent and a frequency of 10 kc./sec. is suitable. Further, if the circuit requirement is that the tone should continue to be sent after the removal of the stimulus which set up the connection to the tone circuit, the pulse generating equipment is preferably of the self maintaining storage type such as a mercury or magnetostriction delay line circulating system or other timing device capable of generating any combination of the pulse trains, each of which can be caused to appear or disappear at the output independently of the appearance or disappearance of any other. Using the principles outlined above a T. D. M. system can be applied to a common control for a switching system of any type but it is convenient to consider register marker telephone exchanges and it is worth considering the functions required of a common control in more detail.

In a register-marker telephone exchange system every calling circuit is first connected to a register. The register, as a result of this, receives information that it is so connected and also information regarding the nature of the calling circuit to which it is connected i. e. its class of service e. g. ordinary subscriber, dial subscriber barred trunks, trunk offering, delayed ringing, key-sending local manual board, V. F. and dial junctions. This information is presented while the connection to the register is being set-up and since most of the functions indicated by the class of service instructions can only be performed subsequently, the information must be stored. The register will then indicate to the calling circuit in the appropriate manner e. g. by the transmission of dial tone for some classes of calling circuit, that designation information i. e. instructions to set-up the call, should be transmitted to the register which will then receive called information for example, in the form of dialled impulses or V. F. signals. The register may simultaneously or alternatively receive further information regarding the nature of the calling circuit e. g. as a minor class of service signal from a caller's instrument indicating the calling party of a party line equipped with key senders, or as an instruction digit from a preceding exchange indicating that a fee is wanted or that a local manual board requiring special facilities is the originating circuit. This variety of general instruction information which controls the type of connection to be set-up must all be presented to and stored in the common control apparatus in a manner suitable for carrying out the required operations. The designation information must also be stored in a suitable manner.

As a result of the designation information sent in to the common control apparatus a connection must be prepared between the calling circuit and some outgoing circuit over which the call is to be advanced towards the destination indicated by the designation information. The preparation of the connection includes not only the selection of the connector switches through which the connection is to be made but must also ensure that appropriate supervisory apparatus is provided to control the connection. The information indicating what supervisory apparatus is required is derived partly from the general instruction-information and partly from the designation information received. For example, the class of service of the calling circuit will indicate whether metering is required in the exchange, whereas the first few digits of designation information will indicate the required rate of charging. Using electronic apparatus for setting-up the connections through the exchange, the speed of the operation enables the setting-up apparatus to work on a time sharing basis in which each connection makes use of a single common marker for a period of time sufficient to set it up.

Although the invention is not restricted to use with electronic telephone exchanges it is convenient to consider it in relation to the electronic exchange system described in U. S. Patent application Serial No. 471,072 in the name of L. R. F. Harris. The registers which are ready to use the marker must therefore be indicated and one of them must be selected. It is therefore necessary to know the amount of designation information which must be sent in before a connection can be established.

In general this amount of designation information will not be invariable even for one exchange and it will depend upon the designation information actually received. Often the first digits will consist of an exchange code possibly preceded by a prefix. Some number of these digits will convey sufficient information for it to be determined how many further digits must be received before the marker can set-up the connection. They may also indicate whether a trunk, toll or other call requiring an outgoing junction is required and which route out of the exchange must be taken. The connection over a junction to a register in a second exchange may be established when sufficient designation information has been received. Designation information may then have to be transmitted from the first register to the second in order to route the call through the next exchange. This designation information will not always be the same as that sent into the first exchange, and translation may be necessary before the marking process starts, but some number of the first digits of the destination information can always determine within the exchange concerned, the route out if it is to be a junction, the amount of designation information to be received before the connection to subscriber or junction can or should be set up, the first digits of designation information to be sent over a junction, and often, the fee to be charged if any or instructions that the fee be determined from apparatus in the next exchange. Usually the number of digits required to obtain a translation of them into routing, sending, or metering information etc., can be determined from the first one or two digits of digits of designation information. Thus the translation need be obtained once only for each connection and may therefore be used, as the marker may be, on a time sharing basis such that each connection makes use of a single common translator for a period of time sufficient to obtain the requisite information. Again those registers requiring the use of the translator will have to be indicated and a selection of one of them made. The received or translated designation information and the general instruction information are thus used to set up the connection and depending upon these items of information the appropriate operations must take place. For example, on an outgoing junction call the digits required to route the call through the next exchange, possibly preceded by an instruction digit—e. g. fee wanted—may have to be sent to the next exchange. This may be done for example by sending one digit at a time using for example "2 out of 5" V. F. coded signals, the signals being sent continuously until a stop send signal is received from the next register to remove the first digit from the line. This is followed by the removal of the stop send signal to enable the next digit to be sent and so on.

Eventually the connection between the calling and the called circuit is set-up and the receipt of various tones, e. g. ring tone, by a register may cause its release. It may also release as the result of the operation of various "time-out" circuits etc. Also under certain circumstances the information received by the register may cause the calling circuit to become connected to busy or N. U. tone etc. and the register may connect the calling circuit to the called circuit before it releases. All these are examples of the type of operation which must be carried out in a register-marker system by the common control apparatus. The application of T. D. M. to carry out these operations will now be described in general terms. It will be clear that the functions to be performed which are described here are only examples of the applications of the techniques and that it is not essential to the invention that the function of the translator, marker, V. F. receivers and their associated circuits, V. F. sender and dial impulse sender should be carried out in the manner described here.

Each connection which is being dealt with by the common control is allotted a time spaced pulse train which is one of a set of N time-spaced trains, one for each such connection. Each pulse train corresponds to a register and it is convenient to refer to the pulse trains as register pulse trains. The information relating to the connection is coded in binary form using the presence and absence of the pulses as the symbols.

In general, information applied to the common control is not continuously available from external sources throughout the period of setting up and it is necessary to store the coded information in suitable storage devices such as mercury delay lines, magnetic drums etc. A delay line of capacity N sections or of a delay equal to, or nearly equal to the pulse repetition time of a pulse train may be used to store one bit of information for each of N registers and its output may be used to indicate those registers for which a particular facility or function is required. Thus each delay line may be associated with a particular facility. For example, all those registers controlling connections from circuits having a particular class of service, for example, ordinary local manual board, could indicate this by the presence of their pulse trains in a delay line used for that purpose. Similarly a delay line of capacity $xN$ sections or of a delay equal to $x$ times the pulse repetition time of a register pulse train may be used to store $x$ independent bits of information for each of N registers.

Thus if each of 99 registers has a pulse train of 0.8 microsecond duration pulses and P. R. F. 10 kc./sec., a 1400 microsecond delay line, herein referred to as a "long" delay line, may be used to store 14 bits of information for each register. Each of these 14 bits corresponds to a pulse train of repetition time 1400 microseconds and all 14 such trains coincide with that of the associated register. Each of the 14 trains may be associated with some different function or facility. For example, one may be used to indicate whether timed or untimed metering is to be used on the connection and 4 more for the fee giving variable charging rates of from 0 to 15 unit fees. The pulses associated with a particular function or type of information for all the connections may be arranged to constitute a time spaced pulse train (a position pulse train) for example of pulse repetition time 1400 microseconds and 100 microseconds duration or of 1400/99 microseconds repetition time and duration 0.8 microsecond or any other arrangement whereby each register pulse train coincides with each position pulse train once every 1400 microseconds. The position pulse trains may be designated PP1, PP2, PP3, PP4 ... PP14, and each may be used for a different purpose for each delay line.

If, for a connection there may be three mutually exclusive types of information (for example a calling circuit cannot be simultaneously a subscriber's line, a manual board and a junction) an economy in storage capacity can be made by using only two delay lines, a pulse in one but not in the other being used for one possibility, while the reverse is used for a second and pulses in both for a third. This use of combinations of delay line outputs results in a large saving in the required total storage capacity.

For a certain type of information the length of the delay line used or the frequency at which the information is made available is chosen to be suitable for the function which the information controls and the method of operation. Thus if information stored is to cause a tone to be transmitted over a circuit a 100 microsecond cycle is used so that the information is available as 10 kc./sec. pulse trains which may be modulated directly and transmitted to the appropriate common channel.

A calling circuit requiring to make a connection through the exchange is connected over the exchange transmission means to a free common control threshold circuit which is individual to the calling circuit for the duration of the setting up of the connection. The threshold circuit is permanently associated with a register pulse train in the common control and it comprises links over which information can be sent and received, to and from the calling circuit and to and from a called circuit to which the calling circuit is eventually connected. These links are connected by modulators and gates to pulse channels common to all threshold circuits. The register pulse trains on these leads may for example be associated with the following: the receipt of a hold signal from the calling circuit, the receipt of V. F. signals from the calling circuit, the transmission of V. F. signals to the calling circuit, the holding of the connection to the calling circuit by the common control, the receipt of a hold signal from the called circuit, the receipt of V. F. signals from the called circuit, the transmission of V. F. signals to the called circuit and holding of the connection to the called circuit by the common control. Other examples of the use of other similar leads are illustrated with reference to the embodiment of this invention described below.

When the connection between a threshold circuit and a calling circuit is established a class of service signal may be sent into the common control over a class of service pair, using for example the technique described later in the specification. This signal is the first information sent to the common control regarding the connection to be set-up. The class of service may denote an ordinary subscriber, a dial subscriber barred trunks, ordinary local manual board (LMB) delayed ringing LMB, trunk offer LMB, key sending LMB, V. F. junction or dial junction etc. It is sent in as a single frequency or as a pulse code individual to the class of service and the receipt of the selected frequency or code causes the pulse train of the selected threshold circuit i. e. the register pulse train to appear on a lead individual to the class of service. This information is presented to the common control only while the calling circuit to common control connection is being established and it must therefore be stored in storage devices e. g. delay lines. It is convenient to store the information in delay lines which are individual to a function to be performed rather than to a class of service. Thus ordinary subscriber, all local manual board classes and dial subscriber barred trunks may all be required to receive dial tone and the pulses on leads associated with any of these classes of service are applied to a 100 microsecond delay line in which the register pulse train is stored if any of these classes of service is indicated. The output lead is connected to a modulator in which the pulses appearing on the output lead are modulated with dial tone and are transmitted to the lead used for the transmission of V. F. signals to the calling circuit. The tone is received in the threshold circuits whose associated pulse trains are so stored and thence are transmitted to the calling circuit.

If dialled impulses are used to transmit designation information they will appear from the threshold circuit as breaks in the appearance of the pulse train on the lead indicating the hold condition of the calling circuit. Those breaks are timed to check that they are of duration appropriate to dial impulse breaks by the use of two delay lines—or rather, since the detection of a dial impulse break involves many milliseconds, two coincident sections of long delay lines one of which stores the fact that a break has occurred and the other that it is of appropriate duration. Another pair of sections of delay lines may be used to detect the intertrain pauses and each dial impulse train can be counted using 5 delay lines such that the count may be made using a 2 out of 5 code. The first break causes the pulse to appear in one combination, the second transfers it to another and so on. At the end of the impulse train the counted digit may be indicated by the presence of the connection's pulse train on two of the 5 leads forming the outputs of the delay lines. This technique is described in detail in U. S. patent application Serial No. 489,994 in the names of S. W. Broadhurst and L. R. F. Harris.

If 2 out of 5 coded V. F. signals are used the receipt of a tone from the calling circuit may be used to cause that particular threshold circuit to become connected to a V. F. receiver which will identify the tones it receives and indicate the digit by the presence of the pulse train on 2 of 5 leads common to all the V. F. receivers. At the end of the V. F. burst the V. F. receiver may be released and used for a further connection. This "pooling" of V. F. receivers will reduce the number required and depending upon their cost this should more than compensate for the additional switching apparatus required. This is more particularly applicable if many dial circuits are connected to the exchange and share the same common control as the V. F. circuits. This technique is described more fully in U. S. application Serial No. 498,376 in the name of L. R. F. Harris in which refinements of signalling systems are discussed.

With the V. F. digital information, a further class of service signal may be received and this also may be stored in delay lines in which the stored pulses are operated upon to cause the required operation to be effected. Similarly the V. F. receiver may receive an instruction digit, if the calling circuit is a V. F. junction indicating for example that trunk offering facilities are required. This information may similarly be stored in delay lines or sections of long delay lines.

The digital information from V. F. receiver or dial counter is indicated to the main digital store by the presence of pulses on 2 out of 5 leads. It is apparent that the checking facility required to ensure that 2 and only 2 signals have been received and that the receipt of 1, 4 or 5 tones does not result in the recording of faulty information, may be done at this point using apparatus common to all the connections being dealt with.

The main digit store may consist of 5 long delay lines in which each position pulse train PP1, PP2 . . . PP11 is used for a different digit. Thus the first digit is stored as the presence of pulses at time PP1 in a combination of 2 out of the 5 delay lines, the second may be stored at time PP2 etc. The pulses are presented to the lines at times appropriate to the digit being received using a distributor consisting of another long delay line in which is stored the pulse train coinciding with the position of the pulse train of the next digit to be stored. The pulse train in this line may be shifted at the intertrain pause or after a change in the information applied to it.

Often the first one or two digits may be used to decide the number of digits required before a translation can be obtained. This information may be derived from the pulses on the input leads to the digit store and may be stored in delay lines which indicate the number of digits required so that when sufficient information has been received an indication can be made that the pulse train is associated with a register for which a translation is now required. There may be several registers in this condition; a selection of one of them is made and the digits stored in the digit store are staticised for example using cold cathode tubes which, via a rectifier or potentiometer network produce a signal on a lead individual to the code (if it is a working code), represented by the appropriate number of digits.

This lead is applied in parallel with other similar leads of other codes to a number of multiplexed pulse generators on the outputs of which appear the translated information corresponding to the original code. This information is coded using the position pulse trains PP1 . . . PP14 on the outputs of the multiplexes which are connected to gates to which the pulses of the selected register are applied so that the information is available using the pulse train appropriate to the connection. These translation multiplexes may give for example (a) the charge of the call and determine whether it should be timed or untimed, (b) the route out if it is a junction call—using any binary combinations of a number of function pulses from a number of multiplexes, (c) the number of further digits required to be received before the connection may be established to the called circuit, (d) the translation of the digits into a 2 out of 5 code, (e) the position of the digits in the digit store which must be sent on to another exchange, and so on. All this information is stored in delay lines, sections of delay lines or combinations thereof. The digits from which the translation was obtained may be deleted from the digit store and replaced by the translation while at the same time the rest of the digits which are being received over the calling circuit are stored in later positions in the digit store. Thus if a translation is obtainable after 3 digits, after the receipt of the digits in PP1, PP2 and PP3 the next digit is inserted at say PP7 while after the translation has been obtained the digits in PP1, PP2 and PP3 are deleted and spaces P1–P6 are used for the translation. It will be clear that this invention is in no way limited to such translating technique.

When sufficient information is transmitted to the common control for the connection to be established the presence of a pulse on a lead indicates that the marker is required. The pulse will be selected and all the relevant information may be staticised in the marker. Thus the junction route out, local line route out, meter information, supervisory information e. g. delay ringing, trunk offer, manual hold ringing, calling subscriber in the exchange, meter information, N. U. etc. is staticised and using techniques to be described later the call is set up through the exchange. The calling circuit may at this stage be connected to busy tone etc.

Depending upon the type of call the common control will then take appropriate action. For example, if any digits are to be sent on to another exchange using V. F. coded signals they are inserted in 2 out of 5 delay lines the outputs of which are modulated with the 5 V. F. frequencies used and transmitted to the called circuit until, for example, a stop send signal is received by a V. F. receiver on the outgoing side of the common control. Such V. F. receivers may be pooled and only picked up when the threshold circuit receives a tone over the called circuit as is described in U. S. patent application Serial No. 498,376 in the name L. R. F. Harris. The receipt of a stop send signal may be used to delete one digit and replace it by the next as soon as stop send is removed. The designation digits may be preceded by an instruction digit using a 3 out of 5 code inserted when the class of service of the calling circuit is received, or as in the case of "fee wanted" when the translation is obtained. A suitable V. F. sender for these functions is described later in the specification and a corresponding unit for the transmission of dial impulses over junctions to electromechanical exchanges is described in U. S. patent application Serial No. 500,557 in the names of L. R. F. Harris and S. W. Broadhurst.

Various timing functions may be performed using techniques, examples of which have already appeared in U. S. patent application Serial No. 436,631 in the name of L. R. F. Harris and these are illustrated further with reference to an embodiment of this invention which will now be described with reference to the accompanying drawings of which Figs. 1A, 1B, 2A and 2B when assembled as shown in Fig. 3 are circuit diagrams in block schematic form of the apparatus and Fig. 6, Figs. 8A, and 8B, when assembled as shown in Fig. 12, Figs. 9A, and 9B when assembled as shown in Fig. 13, Figs. 10A and 10B when assembled as shown in Fig. 14 and Fig. 11 are circuit diagrams showing in more detail component parts of Figs. 1A, 1B, 2A, and 2B, while Fig. 7 shows the waveforms at various points in the circuit of Fig. 6.

Figs. 4 and 6 (the latter with Figs. 5 and 7) are, respectively, circuit diagrams of relevant items of sending equipment alternatively employable in the relationship designated by the block U80 or U80' in Fig. 2A.

The embodiment is of a common control equipment which is suitable for operation with the exchange system described in U. S. patent application Serial No. 471,072 in the name of L. R. F. Harris and with the supervisory equipment described in U. S. patent application Serial No. 436,632 in the name of L. R. F. Harris and relevant units of these specifications will be referred to here.

As was described in U. S. patent application Serial No. 471,072 in the name of L. R. F. Harris connection between a calling circuit and a called circuit is effected by first connecting the calling circuit to a free register which receives designation informaiton from a calling circuit and when sufficient of this has been received to identify the called circuit the register indicates this to a common marker which when it is free becomes connected to the register and sets up a connection between a free called circuit and the register and prepares the connection between the calling circuit and the called circuit, which connection is only completed when the register releases its connections to the calling and the called circuits. As was described in U. S. patent application Serial No. 436,632 in the name of L. R. F. Harris the marker may also be used to insert supervisory equipment onto the connection between a calling and a called circuit, which is appropriate to the class of service of the calling circuit and of the called circuit to which it is connected. The functions of the register and marker in those specifications may be carried out in any of many well known ways and this embodiment of this invention described how they may be carried out using the techniques and systems of the present invention which itself is applicable to any of many exchange systems and is in no way restricted to the system described in U. S. patent application Serial No. 471,072 in the name of L. R. F. Harris although it is convenient to describe an embodiment in relation to this specification.

*General description*

Figure 15:
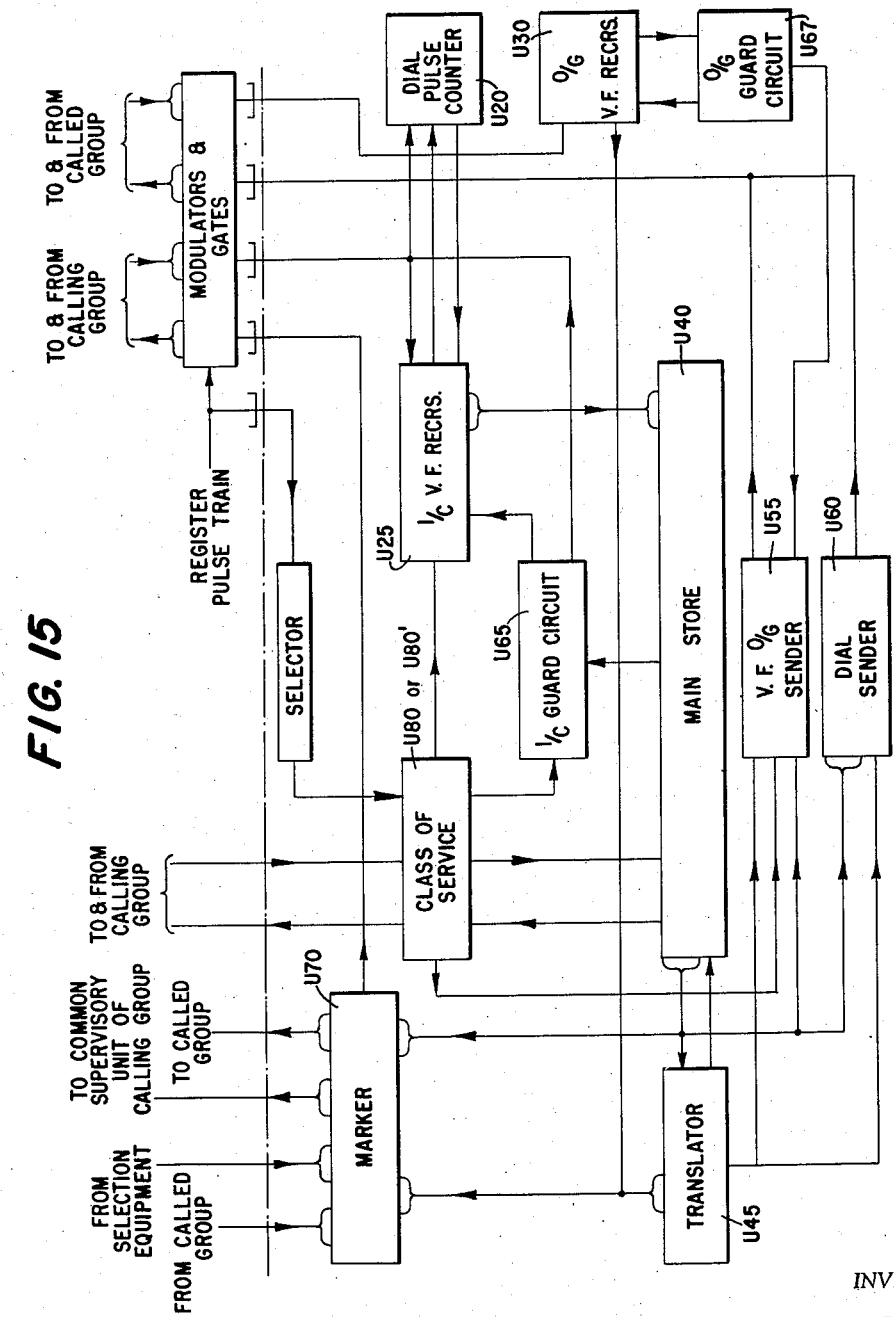
Figure 15 shows an embodiment in block schematic form.

The specification just referred to describes a communication system in which a calling circuit of a group GRP is connected to the control equipment of the present invention by means of an assemblage of gates and modulators. Figure 15 shows a group of leads from one such calling circuit connected to a block indicating the gates and modulators and serving to connect the calling circuit to the common equipment. There are a number of such assemblages of gates and modulators whose outputs are commoned as shown, each assemblage being distinguished from the remainder by a register pulse train applied to the assemblage. The register pulse trains form a series of time spaced pulse trains and each serves to characterize a register.

Figure 15 also show in block schematic form the general layout of the control equipment of the present invention and the following description is a brief explanation of its major components and manner of operation.

A calling subscriber becomes connected to a register which must of course be a free register and a selector is provided to ensure that only one of those registers not already in use can be taken into use by a calling subscriber. The selector is shown as a block in Figure 15 but its operation is detailed below. It is sufficient at this stage to note that a free register is made available and is marked for connection to the calling subscriber.

Information from a calling subscriber passes through the assemblage of gates and modulators at the characterising time of the register pulse train applied to the assemblage as indicated, and is transmitted to a V. F. receiver U25 or a dial pulse counter U20 depending upon the form taken by the transmitted information, i. e. dependent whether V. F. signalling or dialling is used.

The establishment of a connection from a calling circuit to the control apparatus also results in the transmission to the latter of a class of service signal which is received by apparatus U80 or U80'. Again the class of service signal may be transmitted as V. F. signals or dial signals and this reception apparatus appropriate to both forms of transmission is needed. Information derived from the class of service signal may be used to connect the appropriate receiver either U20 or U25 to the calling subscriber.

Information received by U20 or U25 and U80 or U80' is transmitted to a main information from U40 where the information is stored at the characteristic time of the register. The main store has certain facilities which will be explained later and is able to store a predetermined number of designation digits and to control the connection of the V. F. receivers U25 via an incoming guard circuit U65 to prevent a receiver being held unnecessarily if the reception be a digit by U40.

The designation digits stored in the main store indicate the route to be taken by the call. In general, however, the stored digits do not indicate that route in a manner suitable for use directly and therefore it is convenient to translate the received information into a more suitable form and this is effected by a translator U45.

From the translator, information necessary to start setting up the call is sent to a marker U70 which determines to which circuit or circuits connection is to be made and marks them in a suitable manner. The marker also has other functions which are described in detail later.

Information concerning the call may need to be transmitted from the common equipment and for this purpose a V. F. sender U55 and dial sender U60 are provided and connected for control from the main store, marker and translator. U55 or U60 transmit information to a group containing a called circuit in a form suitable for reception by that group.

Information concerning a wanted subscriber and controlling the transmission of information may be sent to the equipment by means of V. F. signals which are received by V. F. receivers U30 with which guard circuit U67 is associated.

*Detailed description*

In the description of the embodiment in U. S. patent application Serial No. 471,072 in the name of L. R. F. Harris, a calling circuit is connected to a register which is selected from among free registers. The input and output leads of the selected register hereinafter referred to as REG1 are shown in Fig. 2 and they are DCL3 which is used to identify the calling circuit when REG1 is connected to the marker, H4, A4, A3, and H3 which are the receive and transmit audio and hold (or signalling) leads connected to the calling circuit, and H6, A6, A5 and H5 which are the receive and transmit audio and hold (or signalling) leads which may be connected to the called circuit.

These circuits are connected to the common control in a manner shortly to be described by gate circuits and modulators to which a pulse train RP1 characterising REG1 is permanently applied. Within the common control information relating to REG1 is stored, controlled and in other ways manipulated by storing, controlling and in other ways manipulating the pulse train RP1. This pulse train is one of a set of equally time spaced pulse trains each of which is used to characterise a register. In systems in which V. F. signals are transmitted to and from the register each pulse train must be such that when modulated it may be used to convey V. F. information and it is assumed here that there are 99 such pulse trains in the set each having a pulse repetition frequency of 10 kc./sec. and a channel pulse time of just over 1 microsecond. There would thus be sufficient pulse trains to serve 99 registers. In systems not using V. F. signals the pulse repetition frequency may be much less and longer pulses may therefore be used for the same number of registers. Here it is assumed that V. F. signals are used.

PIL701 which is an output from a marker U70 is connected to a pulse coincidence gate for each register such as PCG110 for REG1. The output of PCG110 is connected via pulse lengthening means PLM101 to DCL3 such that when a pulse train appears upon PIL701 which coincides with pulse train RP1 which is also applied to PCG110, a D. C. signal appears on DCL3. H4 and A4 are connected to transmit modulator RTM101 to which RP1 is applied such that when a hold signal from the calling circuit appears on H4, pulse train RP1 appears on PL102, which is common to all the registers, and the RP1 pulses are modulated by the audio signals on A4 in RTM101. A4 is also connected to unit 101 whose output is connected to PCG101 to which RP1 is applied such that when audio frequency signals above a certain level appear on A4 the associated pulse train RP1 is transmitted to PL103 common to all registers. This is described in more detail in U. S. patent application Serial No. 498,376 in the name of L. R. F. Harris when it is required to associate an incoming V. F. receiver with REG1. PL104 is connected to a receive modulator for each register such as RRM101 for REG1 which has RP1 applied to it such that when pulses appear on PL104 coincident with RP1 they are transmitted to a demodulator and amplifier DA101 in which the audio modulating signals of the pulses on PL104 are recovered and are transmitted via A3 to the receive audio pair of the calling circuit DA101 is connected to rectifying unit RU101 which produces a hold signal on H3 which is used to maintain the connection between the register and the calling circuit. H6 and A6 are connected to transmit modulator RTM102 to which RP1 is applied such that when a hold signal from the called circuit appears on H6, RP1 appears on PL105 which is common to all the registers, and the RP1 pulses are modulated by the audio signals on A6 in RTM102. A6 is also connected to unit U102 whose output is connected to PCG102 to which RP1 is applied such that when audio frequency signals above a certain level appear on A6 the associated pulse train RP1 is transmitted to PL106 common to all registers. [The unit U102 and its associated indication is used as described in more detail in U. S. patent application Serial No. 498,376 in the name of L. R. F. Harris when it is required to associate an outgoing V. F. receiver with REG1]. PL107 is connected to a receive modulator for each register such as RRM102 for REG1 which has RP1 applied to it such that when pulses appear on PL107 coincident with RP1 they are transmitted to demodulator and amplifier DA102 in which the audio modulating signal of the pulses on PL107 are recovered and may be transmitted via A5 to the receive audio pair of the called circuit. DA102 is connected to rectifying unit RU102 which produces a hold signal on H5 used to maintain the connection between the register and the called circuit.

Those registers which are in use will have their pulse trains appearing on PL104 as will shortly be described and this provides a convenient way of producing the required pulse trains on PIL1 connected to the register selector SEL1, which is an alternative to the method described in the U. S. patent application Serial No. 471,072 in the name of L. R. F. Harris. Thus all the register pulse trains are commoned onto PL101 which is connected to pulse suppression gate PSG101 where appropriate versions of the free register pulse trains are transmitted to PIL1, the others being suppressed by the busy register pulse trains appearing on PL104. PIL1 is connected to pulse lengthening means PLM1 in which a signal is generated on RFL1 if there is a free register as described in the specification of co-pending patent application Serial No. 471,072 in the name of L. R. F. Harris. PIL1 is also connected to SEL1 which selects one of the pulse trains so applied to it and therefore a free register associated with the selected pulse train. The selected register is D. C. indicated on a combination of D. C. indicating leads as described in U. S. patent application Serial No. 471,072 in the name of L. R. F. Harris and here is also pulse indicated on pulse indicating lead PIL101 by the presence of the selected register's pulse train. This indication is used in the presentation of class of service information to the common control as described later but is also used to indicate to the common control that register pulse train which has been selected.

With 99 pulse trains it may be convenient to use selecting means as described in U. S. patent specification No. 2,727,094 granted to S. D. Harper and L. R. F. Harris for SEL1 in which case the selected register will be D. C. indicated by a signal on a combination of two D. C. indicating leads, one from each of two groups, having 9 in one group and 11 in the other. However it would be possible to use the selecting means described in U. S. patent application Serial No. 404,760 in the name of L. R. F. Harris provided each of the 99 pulse trains is produced on its individual combination of pulse leads in a set. The selected register would then be D. C. indicated on a combination of leads in which the combinations used are not restricted to being taken one from each of a number of groups.

When the connection between a calling circuit and a register is established, a class of service signal is sent into the common control and this may be achieved using the technique which will now be described with reference to U80 and U80¹ which will now be described.

Figure 4:
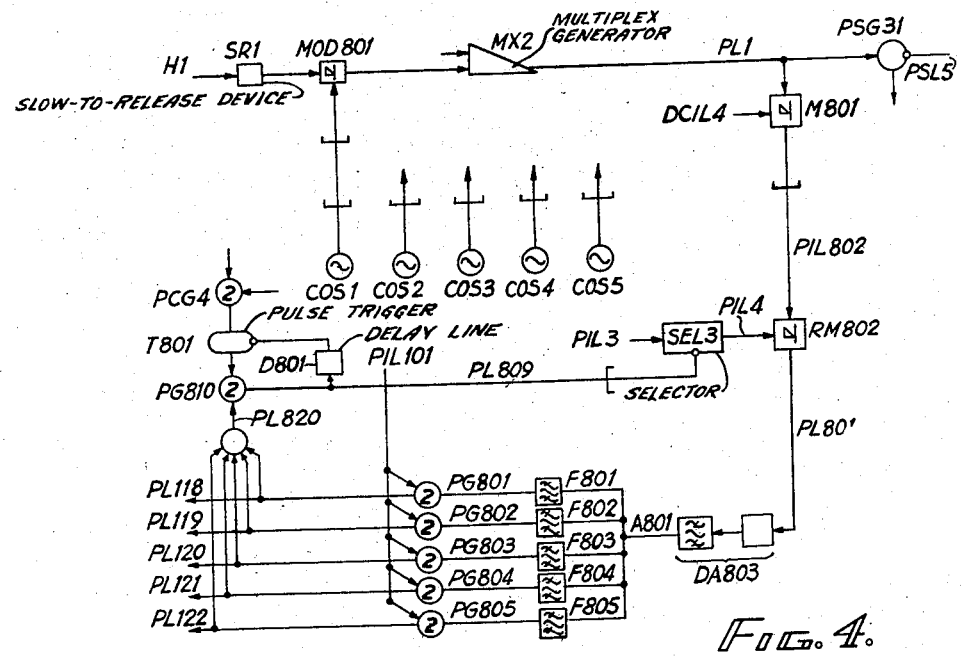
Figure 5:
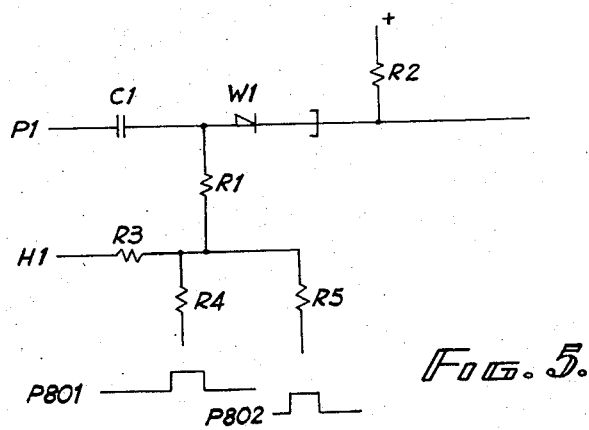

U80 and U80¹ shown as one box in Fig. 2A provide two alternative methods of sending in the class of service to the common control and both will be described. In both descriptions reference is made to U. S. patent application Serial No. 471,072 in the name of L. R. F. Harris and relevant items of the diagrams of that specification are shown in Figs. 4 and 6. Fig. 4 illustrates U80 and Fig. 6 together with Figs. 5 and 7 illustrate U80¹.

In both unit U80 and unit U80¹ the principle involved in transmitting the class of service to the common control is the same. It is to use the operation of the selecting apparatus to indicate the class of service of the calling circuit it has selected. Clearly since this selecting apparatus is in a state individual to the calling circuit a signal may be derived which indicates the class of service associated with that individual state and therefore wtih the selected calling circuit. In U80 the class of service is received as an audio frequency individual to the class of service, and in U80¹ a pulse code is received which is individual to the class of service.

As described in U. S. patent application Serial No. 471,072 in the mame of L. R. F. Harris, the transmit hold lead of each external circuit is connected via a slow to release device SR1 to a multiplex MX2 provided for all the circuits in the group. On an output PL1 of the multiplex, the state of transmit hold lead H1 is indicated by the presence or absence of the pulse train characterising the associated circuit. As shown in Figs. 4 and 6 the pulse may be modulated using MOD801 by a signal individual to the class of service of the circuit which may be, for example, an ordinary subscriber barred trunks and toll calls, a keysending manual board, a V. F. junction connected to a similar electronic telephone exchange, a junction connected to a Strowger electromechanical exchange etc. Thus on the output lead PL1 of MX2 would appear the pulse trains of those circuits of the group which are either calling for connection or have already been connected and each pulse train would be modulated by a signal, individual to the class of service of its associated circuit. These pulse trains are applied to pulse suppression gate PSG31 in which the busy circuits' pulse trains are deleted by coincident pulse trains appearing on PSL5 leaving only the free circuits pulses appearing on the output of PSG31. Such indications will cause the selection of a group which includes a calling circuit which may be connected to a free register and this will be indicated on a lead DCIL4 individual to the selected group. This lead is connected to modulator M801 in addition to those gates already described in U. S. patent application Serial No. 471,072 in the name of L. R. F. Harris. PL1 is connected to modulator M801 so that the pulse trains on the output of MX2 of the selected group are transmitted to lead PIL802 common to all groups. When the circuit within the selected group has been selected by SEL3 the pulse train of the selected circuit is generated on PIL4 which is connected to receive modulator RM802 in addition to the gate already described in U. S. patent application Serial No. 417,072 in the name of L. R. F. Harris. PIL802 is also connected to RM802 and thus on the output of RM802 appears the modulated pulse train of the selected circuit.

One way of modulating the pulse trains of each circuit is to use a voice frequency signal for each class of service. Thus Fig. 4 shows five tone oscillators, COS1, COS2, COS3, COS4 and COS5, each associated with one class of service and each connected to the modulators as MOD801 of all the circuits having the same class of service. The pulse trains transmitted through RM802 are thus modulated with a class of service tone. After demodulation and amplification in DA803 the tone characterising the class of service of the selected calling circuit appears on audio circuit A801 until SEL3 is released.

A801 is connected to a number of filters, F801, F802, F803, F804 and F805, one for each of the class of service tones used such that a signal appears on the output of the filter provided for the class of service of the selected calling circuit and on none of the other filter outputs. The outputs of the filters are connected to pulse gates PG801, PG802, PG803, PG804 and PG805 respectively to which the pulse train of the selected register is applied on lead PIL101 from SEL1. Thus the selected register's pulse train will appear on the output of one of the pulse gates and the lead on which the pulse train appears indicates the class of service of the circuit to which it has been connected.

Clearly any reasonable number of classes of service may be indicated in this way and in this embodiment F801, PG801 and its output lead PL118 are used to indicate that the selected calling circuit is an ordinary subscriber; F802, PG802 and its output lead PL119 are used to indicate a barred trunks and toll call subscriber; F803, PG803 and its output lead PL120 are used to indicate a keysending manual board; F804, PG804 and its output lead PL121 are used to indicate a junction to a similar electronic exchange and F805, PG805 and its output lead PL122 are used to indicate a junction to a director electromechanical exchange.

Alternatively the pulse trains of each circuit may be modulated by applying combinations of coding pulse trains to modulators such as MOD801. To obtain five classes of service as required in this embodiment three pulse trains P801, P802 and P803 are used and their timing may be as shown in Fig. 7 where P1 is the pulse train characterising one circuit of each group of circuits. The principle here is to increase the amplitude of some of the pulses of each circuit pulse train so that, say every other pulse of the train may be in either two ranges of amplitude. These two ranges of amplitude of pulses may be regarded as the symbols of a binary code and each class of service is associated with a particular combination of symbols in this binary code.

The circuit of Fig. 5 shows the first stage of the multiplex pulse generator MX2 in one method of achieving the required result. The pulse train P1 of a circuit is applied via a capacitor C1 to the junction of a rectifier W1 and resistor R1. Rectifier W1 is also connected via a resistor R2 common to a plurality of such gates to a fixed potential. With the end of R1 remote from W1 substantially negative to that potential rectifier W1 does not conduct even during the pulses and this is the normal condition until a calling or a hold signal applied on H1 connected to R1 via R3 causes W1 to conduct so that the half amplitude pulses are transmitted to R2. If in addition a positive pulse is applied to R1 via R4 or R5 from P801 or P802 the full amplitude of pulse is transmitted to R2. By connecting the junction of R1 and R2 to a combination of the three pulse sources P801, P802 and P803 a corresponding code of large and small pulses will appear across R2 and hence of PL1. Because of the slow operation of the gate under the D. C. control due to the charging of capacitor C1 via resistor R1 it is convenient to use pulses of P801, P802 and P803 of duration say twice the pulse repetition time of the circuit pulse trains. This gives one such pulse repetition time for the charging or discharging of C1 and a second period in which the pulse amplitude will be more definitely in one state or the other. The variations of amplitude of P1 on PL1 is indicated in Fig. 7 assuming that P801 and P802 are connected to R1 in order to modulate P1.

The amplitude coded pulses on the output of RM802 are amplified in amplifier AMP801 and are transmitted to discriminator DIS801 in which the small amplitude pulses are suppressed leaving only the large amplitude pulses on its output lead PL801. Thus if CT1 is the selected calling circuit large amplitude pulses occur which coincide with the second half of each P801 pulse (not in the first half because of the build up in the gate of Fig. 5) in both halves of each P802 pulse and in the first half of P803 (due to the hangover of the gate of Fig. 5). This is shown in Fig. 7. PL801 is connected to three pulse coincidence gates PCG821, PCG822 and PCG823 to which pulse trains P801¹, P802¹, and P803¹ are respectively applied and whose pulses coincide with the second halves of P801, P802 and P803 respectively. The pulses will be transmitted through the gates if coincident pulses appear on both inputs and their outputs operate triggers T802, T803 and T804 respectively. Thus in this example T802 and T803 are operated by the pulses appearing on PL801.

The outputs of the triggers are connected to gates DCG801, DCG802, DCG803, DCG804 and DCG805 either as operating or inhibiting leads. Each output is associated with a combination of operated triggers and when a combination of triggers is operated a signal appears on the output of the associated gate. DCG801 gives an output when T802 only is operated; DCG802 indicates for T803 only; DCG803 for T804 only; DCG804 for T802 and T803 and DCG805 for T802 and T804. Each D. C. gate corresponds to a class of service and their outputs are connected to PG801, PG802, PG803, PG804 and PG805 respectively to which the selected register pulse train is applied when the class of service information has been staticised on the triggers. As it will take a complete cycle of the class of service pulses P801, P802 and P803 for this information to be staticised and as during this time a false combination of triggers may be operated, the gates PG801, PG802, PG803, PG804 and PG805 must not be opened until all three pulses have occurred. This may be achieved using trigger T805 which is operated after all three pulses could have operated T802, T803 and T804 and whose output is connected to PG810 to which PIL101 is connected so that the selected register pulse is only applied to PG801, PG802, PG803, PG804 and PG805 when T805 has been operated. T805 may be operated when a second pulse of the pulse train which operated one of the three triggers T802, T803 and T804 occurs. Thus the outputs of triggers T802, T803 and T804 are connected via delays D802, D803 and D804 respectively to gates PG811, PG812 and PG813 respectively to which the outputs of the triggers input gates PCG821, PCG822 and PCG823 are also connected respectively. One of the triggers will become operated and after a complete cycle of the class of service pulses a second pulse will attempt to operate it. This second pulse is transmitted through say PCG821 and PG811 to a lead common to PG811, PG812 and PG813 and will operate T805. The delays D802, D803 and D804 are small delays to prevent the pulse which operated a trigger from also being transmitted through the associated gate to operate T805. The selected register pulse will then appear upon one of the five leads PL118, PL119, PL120, PL121 and PL122 each individual to a particular class of service.

With the arrangement described in U. S. patent application Serial No. 471,072 in the name of L. R. F. Harris, SEL3 may be released before the class of service is received in the common control but the release of the selectors used in setting up the register to calling circuit connections may clearly be made to depend on the appearance of a pulse on any one of the pulse leads PL118 . . . PL122 as well as upon the receipt of a hold signal from the register on the receive hold lead of the selected calling circuit.

For example as shown in Figs. 4 and 6 the leads PL118, PL119, PL120, PL121 and PL122 could be connected via suitable decoupling means to a lead PL820. A pulse on PL820 indicates that a class of service indication has been received by the common control. The output of PCG4 shown in the drawings accompanying the U. S. patent application Serial No. 471,072 in the name of L. R. F. Harris is connected to trigger T801 which is operated when the backward hold is returned to the calling circuit as indicated by a pulse on the output of PCG4. The output of T801 is connected to PG810 to which PL820 is connected so that when a class of service signal is received a pulse appears on the output PL809 of PG810 which releases all the selecting means used to set up the connection between the calling circuit and the register and also, in the case of Fig. 6, the triggers T802, T803, T804 and T805. Also after a short delay due to delay D801, this pulse may release T801.

The V. F. method of indicating the class of service is somewhat simpler and finds application when the number of actual circuits in each of the groups in the exchange is small enough for pulse trains of 5–10 kc./sec. repetition frequency to be permanently associated with each circuit in MX2 (Figs. 4 and 6). When the number of circuits in each group is larger the pulse repetition frequency of these pulse trains is reduced and the available signalling bandwidth is correspondingly reduced and the method of Fig. 6 is preferred.

However, using either method, the class of service of the calling circuit is indicated by the presence of a pulse or pulses of the selected register on a pulse lead individual to the class of service. Thus pulse leads PL118, PL119, PL120, PL121 and PL122 are individual to the ordinary dial subscriber, barred trunks subscriber, key sending manual board, electronic exchange junction and electromechanical exchange junction classes of service respectively. The pulse indication on these leads are used to operate storage devices each comprising a timing device capable of storing any combination of the register pulse trains such as a mercury delay line circulating system of appropriate length. Each such storage device is appropriate to some function to be performed for a number of classes of service. Thus the classes of service of ordinary subscribers, and barred trunk subscribers both demand that the call should be charged for and appropriate metering apparatus be inserted on the connection between the calling and called circuit connection when this is set up. PL118 and PL119 are therefore connected via decoupling means DM109 to timing device TD111 where the pulse trains of all the registers which are controlling connections requiring metering information are stored and indicated on output pulse lead PL132. If a calling circuit is barred trunks, then should a trunk or toll prefix P1 or P2 be received from the calling circuit. N. U. tone must be returned to the calling circuit. The pulse train of register connected to barred P1 and P2 calling circuits are stored in TD110 to which PL119 is connected as an operating lead. The output lead PL125 of TD110 is connected to the main store apparatus U40 to be described with reference to Figs. 8A and 8B and where a signal is derived to cause N. U. tone to be reverted should a P1 or P2 prefix be received from a barred trunk or toll circuit.

The indication that the calling circuit is a keysending manual board appears on PL120 and operates timing device TD109 the output lead PL127 of which is connected to the guard circuits shown as U65 in Fig. 2A where it is used to cause the operation of these guard circuits in a number appropriate to keysending manual boards. Similarly the indication on PL121 that the calling circuit is a junction from a similar electronic exchange is stored in TD108 which indicates on its output PL128 to the guard circuits shown as U65 and described in the specification just referred to, to cause the guard circuits to operate in a manner appropriate to V. F. signalling between registers.

To illustrate the operation of such a common control in director areas, and its operation in conjunction with electromechanical exchanges, the director exchange class of service has also been included. The indication of that class of service appears on PL122 which operates TD107 and the pulse trains stored therein appear on output lead PL124 which is connected to the main store U40 to cause that to indicate in an appropriate manner when a translation of the received information from the calling circuit is required.

If the class of service of the calling circuit is that of an ordinary subscriber, a barred trunks subscriber or a keysending manual board, dial tone should be reverted to the calling circuit until the time that the first digit is received. PL118, PL119 and PL120 are connected as operating leads via PSG103 to TD105 which stores the pulse trains of registers connected to calling circuits on which it is required to send dial tone. The output lead PL123 of TD105 is connected to transmit modulator TM103 to which a source of dial tone is connected such that all the pulse trains stored in TD105 are modulated with dial tone and are transmitted via PL110 to modulator M111 and the dial tone is transmitted to the calling circuit in a manner to be described shortly.

The indication on PL120 that the calling circuit is a keysending manual board is applied via decoupling means M113 and pulse lead PL129 to V. F. sending apparatus U55 in order that the information regarding the calling circuit connected to the register may be transmitted over a junction to another similar exchange as an instruction digit if necessary. U55 is described in greater detail later in the specification.

Using these examples it is clear that the class of service information may be stored in timing devices appropriate to the functions to be performed for the various classes of service and that this information will be available using the register pulse indications after the class of service indications on PL118, PL119, PL120, PL121 and PL122 have disappeared as a result of the release of the selecting means used in setting up the class of service connection between the calling circuit and the selected register.

When a connection between a calling circuit and a register is made, the forward hold from the calling circuit is received on a register receive hold lead such as H4 for REG1 and as already described this causes the appearance of the associated register pulse train on PL102. Lead PL102 is connected as an operating lead to timing device TD101 and thus the pulse trains of all the registers connected to calling circuits are stored in TD101 and are indicated on the output lead PL108. PL108 is connected via pulse suppression gate PSG102 and decoupling means DM106 to pulse lead PL104. PL108 is also connected to modulator M111 to which pulse lead PL110 is connected such that when a register's pulse train appears on PL108 the modulated pulses on PL110 are transmitted through modulator M111 to PL104 via decoupling means DM106 and also become inhibiting signals to PSG102. Thus while a pulse train is stored in TD101 it will appear on PL104 either directly over PL108 or as a modulated pulse train from PL110. The pulse trains on PL104 will cause a hold signal to be transmitted from each register to the calling circuit to which it is connected. The receipt of this hold signal by the calling circuit may be used to initiate the release of the selecting apparatus as described in U. S. patent application Serial No. 471,072 in the name of L. R. F. Harris as already indicated.

PL108 is also connected via pulse suppression gate PSG120 and decoupling means DM107 to pulse lead PL107 on which will appear pulse trains coincident with those on PL108 unless coincident pulse trains appear on PL602 to inhibit the transmission through PSG120. Pulse trains on PL107 will cause a hold signal to be transmitted from each register to the called circuit to which they are connected (if any). By applying dial impulse breaks to these pulse trains by suppressing the pulse trains in PSG120 over PL602 from a dial sender shown schematically as block U60 dial breaks in the hold will be received at the receive hold lead of the called circuit and with the aid of a simple relay set these may be converted into suitable dial breaks for transmission over junctions to electromechanical exchanges. Dial sender U60 is described in greater detail in U. S. patent application Serial No. 500,557 in the names of L. R. F. Harris and S. W. Broadhurst.

Thus when the selecting means connecting a calling circuit to a register releases, the register is transmitting a hold signal to the calling circuit and is prepared to transmit a hold signal to the called circuit when that circuit is connected and has all the class of service information relating to the calling circuit stored using the register pulse train in appropriate timing devices. Dial tone is sent to the calling circuit if its class of service indicates that this is required.

Depending upon the class of service of the calling circuit designation information will be received either using dialled impulses or using V. F. coded signals. The former are identified and counted in the dial impulse counter U20 which is described in detail in U. S. patent application Serial No. 489,994 in the names of S. W. Broadhurst and L. R. F. Harris. The dial impulse breaks are presented to it as breaks in the hold pulses appearing on lead PL102 connected to U20 and the fact that the breaks of dialled impulse duration are to be counted and treated as designation information is indicated by the absence of the register pulse train from PL109 which is connected via decoupling means DM108 to leads PL127 and PL128 upon which appear the pulse trains of those registers which are to receive designation information as V. F. signals as indicated by the class of service of the calling circuit as already described and by the presence of the pulse trains on PL104. Those breaks are timed to check that they are of duration appropriate to dial impulse breaks by the use of two delay lines, or rather, since the detection of a dial impulse break involves many milliseconds, two coincident sections of long delay lines one of which stores the fact that a break has occurred and the other that it is of appropriate duration. Another pair of sections of delay lines may be used to detect the intertrain pause and each dial impulse train can be counted using 5 delay lines such that the count may be made using a 2 out of 5 code. The first break causes pulse to appear in one combination, the second transfers it to another and so on. At the end of the impulse train the counted digit may be indicated by the presence of the connection's pulse train on two of the five leads forming the outputs of the delay lines. At the end of each digit received by the dial counter the digit is indicated by the presence of the register pulse train on a combination of two of the pulse leads PL201, PL202, PL203, PL204 and PL205 on the outputs of U20.

If V. F. coded signals are to be received from either a similar exchange or from a keysending manual board, the V. F. coded signals may each be received in a V. F. receiver selected from a common pool of receivers each of which is available for use by any register and one of which is temporarily alloted to a register when that register is receiving a V. F. signal. The unit U25 performs these functions and its operation is described in detail in U. S. patent application Serial No. 498,376 in the name of L. R. F. Harris. If 2 out of 5 coded V. F. signals are used the receipt of a tone from the calling circuit may be used to cause that particular threshold circuit to become connected to a V. F. receiver which will identify the tones it receives and indicate the digit by the presence of the pulse train on 2 of 5 leads common to all the V. F. receivers. At the end of the V. F. burst, the V. F. receiver will be released and used for a further connection. This "pooling" of V. F. receivers will reduce the number required and depending upon their cost this should more than compensate for the additional switching apparatus required. This is more particularly applicable if many dial circuits are connected to the exchange and share the same common control as the V. F. circuits. The modulated register pulse trains on lead PL102 are applied to U25 and the pulse trains of those registers which are receiving V. F. signals above a certain level are also applied to U25 on lead PL103. The coded numerical signals used in this embodiment are combinations of 2 out of 5 frequencies, but these signals may be preceded by an instruction digit using a combination of 3 out of the same 5 frequencies. Also an instruction digit may be sent into the exchange accompanying the first numerical digit in the form of a frequency different from the 5 numerical frequencies. In this embodiment the numerical signals received by a V. F. receiver are indicated by the presence of the pulse train of the register to which the V. F. receiver is temporarily connected on a combination of the 5 output leads from U25, PL251, PL252, PL253, PL254 and PL255. Fig. 2A shows one other output lead PL256 on which will appear the pulse trains of registers receiving the additional instruction digit that the fee to be charged for the call is unknown at the exchange of origin and is required to be derived in this exchange and that the metering apparatus must be inserted on the connection in this exchange. PL256 is connected via DM109 to timing device TD111 in which is stored all the pulse trains of registers requiring metering apparatus to be effective on the connection through the exchange, and which indicates these pulse trains on PL132. The V. F. receiver unit U25 is only used by registers for which it is known from the class of service that V. F. signals are to be received. This is indicated on PL109, as already described, and which is connected to U25.

The five leads PL251, PL252, PL253, PL254 and PL255 from the common pool of V. F. receivers correspond exactly with the five leads PL201, PL202, PL203, PL204 and PL205 respectively from the dial counter. Depending upon the class of service of the calling circuit each designation digit will be received and indicated by the register pulse train on a combination of leads from one set of leads or the other. Corresponding leads are connected via suitable coupling circuits to a set of five leads PL111, PL112, PL113, PL114 and PL115 which are connected to U40 which is the main storage of the common control and which is described in detail with reference to Fig. 8. PL251 and PL201 are connected to PL111; PL252 and PL202 are connected to PL112 etc.

Figure 8A:
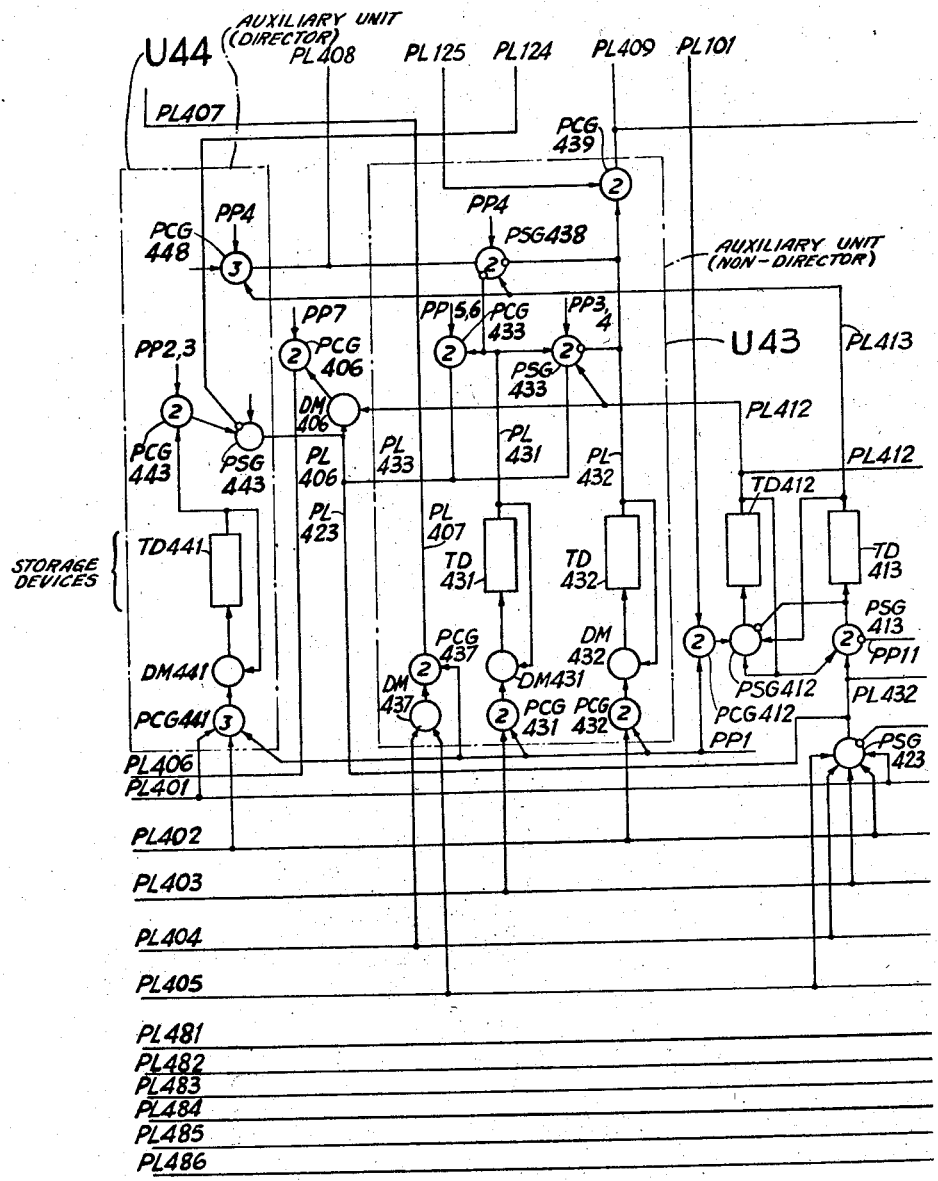

The main store unit U40 will now be described with reference to Figs. 8A and 8B assembled as shown in Fig. 12. Unit U40 includes an auxiliary unit U43 which is used only in a Non-Director type exchange, or an auxiliary unit U44 which is used only in a Director type exchange.

The main digit store comprises 5 timing devices TD401, TD402, TD403, TD404 and TD405 which may be for example mercury delay line circulating systems each having a delay of 1400 microseconds. They thus store 14 pulses for each register. A series of 14 position pulse trains designated PP1, PP2, PP3, PP4, PP5, PP6, PP7, PP8, PP9, PP10, PP11, PP12, PP13 and PP14 is used to identify each of the 14 pulses of each register in the timing devices TD401, TD402, TD403, TD404 and TD405. Each pulse of each of the 14 pulse trains coincides with each pulse of each of the 99 pulse trains once and once only in a period of 1400 microseconds.

Designation information is received by a register either as dial impulses or as V. F. signals and appears digit by digit as the pulse train of the appropriate register (e. g. RP1) on 2 or 3 of the 5 pulse leads PL111, PL112, PL113, PL114 and PL115. The first digit to be stored is identified with position pulse train PP1, the second digit with PP2, and so on for all 99 registers. The timing device TD412 has a capacity of 14×99 pulse trains and generates one position pulse train for each register in order to provide identification of the position to be occupied in the digit store TD401, TD402, TD403, TD404 and TD405 by each successive digit as it is received by each register.

The remaining timing devices, namely TD413, TD414, TD415, TD431, TD432 and TD441 each have a capacity of 99 pulse trains. TD413 is used for shifting each register pulse train stored in TD412 so that it will coincide with the desired pulse train PP1, PP2, etc. as digits are received in the store. TD414 and TD415 are used in connection with the checking and timing circuits to check that digits are being received correctly. TD431, TD432 and TD441 are used to give access to the first digit stored in part of the digit store at the times of any of the pulse trains PP1, PP2, PP3, PP4, PP5, PP6, PP7, PP8, PP9, PP10, PP11, PP12, PP13 and PP14. Normally the digit store can give access to this digit only at the time of pulse train PP1: and giving access at any time enables the translator to be used at a stage in the receipt of information dependent on the first digit received by the store.

Each of the delay line timing devices has associated with it a pulse coincidence gate to which is applied the pulse trains of all registers which are connected to calling circuits. Thus enabling a register pulse train to be removed from all timing devices.

The main store is described as having certain facilities by way of example to illustrate the principles involved in providing these facilities and it will be understood that other facilities can be provided by following these same principles. The facilities described provide for the storing of all designation digits up to a maximum of 11 received in the form of the register pulse train appearing on two and only two of the five pulse leads PL111, PL112, PL113, PL114 and PL115. If the call is from a V. F. junction these digits may be preceded by an instruction digit indicated by the register pulse train appearing on three and only three of the five pulse leads PL111, PL112, PL113, PL114 and PL115. Such an instruction digit is not stored in the main store but may be indicated by the presence of pulses of the register pulse train on a lead individual to the instruction digit. Thus if the register pulse train appears on the particular combination of PL113, PL114 and PL115 the register pulse train is caused to appear on PL410 for a short period indicating a Calling Manual Board. PL410 is connected to PL129 via decoupling means DM113 which as already described is connected to the V. F. sending apparatus U55 where the same instruction may be repeated to a further exchange if necessary. PL410 is also connected as an operating lead to timing device TD106 in which are stored the register pulse trains which have received the calling manual board instructuion digit from a V. F. junction. TD106 indicates these pulse trains on its output lead PL126 which is connected via decoupling means DM110 to which PL127 is also connected. On PL131, the output of DM110, appear the pulse trains of registers dealing with calling manual board calls.

When receiving information from V. F. sources, as indicated by the presence of the register pulse train on lead PL109, the appearance of a register pulse train on only 1 or on 4 or on 5 of the pulse leads PL111, PL112, PL113, PL114 and PL115 or meaningless combination of 3 of them is treated as incorrect: the time for which such signals persist is measured by TD415 an N. U. indication being given on PL409 after a certain time; when receiving dial pulses an N. U. indication is given immediately if anything other than a register pulse train on two of the five leads is received.

When a genuine digit has been received and stored by a register a pulse or pulses of the register pulse train appear on lead PL411 which deletes from TD105 the register pulse train if it is stored there thus terminating the transmission of dial tone back to the calling circuit. PL411 is also connected to U65 whose function is to prevent one of the free V. F. receivers in U25 from being held unnecessarily after the receipt and storage of a digit by U40. This is achieved using PL653 connecting U65 with U25. On PL653 will appear the pulse trains of those registers for which although they are receiving designation signals using V. F. tones, it is known that no new information can be received. This feature is by no means an essential part of the invention itself and is described in U. S. patent application Serial No. 498,376 in the name of L. R. F. Harris and with U65, U67, U25 and U30. For V. F. junction working a "stop send" signal is derived in U65 which is transmitted over PL654, PL110, PL104 etc., to the calling circuit.

The store described here can accept 11 digits which may consist of a prefix, a 5 digit exchange code and a 5 digit subscriber's number. It will be assumed here though that the exchange described in this specification has a 4 digit subscriber's numbering scheme.

The designation digits stored in the main store for each register indicate the route out of the exchange. If a junction call is indicated the designation digit to be transmitted to the next exchange to advance the progress of the call can also be determined. The received digits together with the class of service and received instruction digit information decide the supervisory equipment required to be effective on the connection which the rgister controls. In general the received information does not convey this information in a form suitable for use directly and it is convenient although not fundamentally necessary to translate the received information into more suitable signals before actually using it. Fig. 1A shows a unit U45 which performs these translating functions and which is described more fully with reference to Figs. 9A and 9B assembled according to Fig. 13.

Normally the register is connected to the translator when it has received sufficient information for it to be known that a translation is obtainable. Pulses coincident with the pulse trains of registers which have received sufficient digits for a translation to be obtained appear on PL406 connecting U40 to the translator U45. The digital information in the main store is presented on the five output leads PL401, PL402, PL403, PL404 and PL405 of U40.

Hence each digit for each register is presented as a pulse on a combination of two of the leads at a time coincident with a pulse of the register pulse train and coincident with a position pulse train of which there are 14, PP1, PP2, PP3, PP4, PP5, PP6, PP7, PP8, PP9, PP10, PP11, PP12, PP13 and PP14, each of 1.01 microsecond pulse channel duration and 14×1.01 microsecond pulse repetition time. For each register each digit appears every 99×14×1.01 microseconds—1.4 milliseconds. These five leads are connected to the translator in which the relevant information conveyed by them is staticised when the register is selected to use the translator. They are also connected to the marker U70 (Fig. 1), the V. F. sender U55, the dial impulse sender U60.

However, in the case of local calls in the non-director exchanges, or in the case of non-tandem working director exchanges in which the calling circuit's class of service is that of a junction, little translation of information need be carried out before attempting to set up the call and in this embodiment it is assumed that on these two types of call no translation is required and that the meter information appears directly from the main store on lead PL407 and that the "start setting up" signal, which indicates the number of digits to be received by the main store before the connection can be set up in the exchange is indicated directly on PL408. For a local call, the charge is normally a unit fee which is indicated on PL407 as a pulse occurring at the time of PP1 for the register. For junction calls from director exchanges the fee will already have been decided and no information is presented on PL407. In the case of a Director exchange, unit U44 provides for selection of the translator normally after storing 3 digits but after the first digit if this is "0" it also causes the numerical digits to be stored in TD401, TD402, TD403, TD404 and TD405 in the positions of PP7, PP8, PP9 and PP10 so that they can be accepted by the marker. On receipt of a class of service signal on PL124 indicating the Strowger junction class of service and therefore that numericals only will be received unit U44 causes the digit store to be connected to the marker after 4 digits have been stored.

In a non-director exchange, unit U43 determines whether the first digit stored is "0," "9," "8" or "1–7." If a class of service signal on PL125 has indicated that the prefixes P1 (8) and P2 (0) are barred and that the first digit stored is "8" or "0," an N. U. indication is given on PL409. If P1 and P2 calls are not barred, a translation is given after 4 digits in the case of P1, and the numerical digits are stored in the positions of PP7–10 and after 6 digits in the case of P2. If the first digit stored is "9" a translation is given after the second digit is stored. If the first digit is a numeral (1–7) U43 causes the digit store to be connected to the marker after 4 digits have been stored, and also indicates that the unit fee is to be charged by the register pulse train appearing on PL407 at the time of position pulse train PP1.

These functions of U40 will now be described in more detail with reference to Figs. 8A and 8B to Fig. 12.

The appearance of the pulse train of a register, say RP1, on any of leads PL111-5 causes its appearance on the output of decoupling means DM415 from which it is applied to the gates PCG415, PSG415 and PSG409. If the register is receiving V. F. signals the pulse train RP1 appears on PL109, and is applied to the gates PCG414 and PSG415, and continuously suppresses the gates PSG409 and PSG411 for this register. The gate PCG415 is opened by a pulse XP401 and the gate PSG415 therefore allows the pulse train RP1 into TD415 provided that PSG415 is not suppressed by the pulse train RP1 appearing on PL419. Suppression will occur if the first digit received consists of the appearance of the register pulse train RP1 on three of the five leads PL111-5 or if any digit received consists of RP1 on two of these leads. Here suppression occurs for any 3 out of 5 combinations of the first digit although only one such combination is operative. However in practice the other combinations may be used for other instruction digits and clearly suppression could be provided only if operative combinations appear. Gate PCG418 applies to register pulse train to PSG418 whenever it appears on two or more of the leads PL111-5. Gate PCG419 applies a register pulse train to PSG419 and suppresses the register pulse train at PSG418 whenever it appears on three or more of the leads PL111-5. Gate PCG420 suppresses the register pulse train at PSG419 whenever it appears on four or five of the leads PL111-5. The output of TD412 over pulse lead PL412 and the position pulse train PP1 are applied to gate PSG419 which can therefore apply the combination of PP1 and the register pulse train RP1 to DM419 only when the combination of PP1 and RP1 appears on PL412 and RP1 appears on 3 and only 3 of the leads PL111-5. Gate PSG418 applies the register pulse train RP1 to lead PL418 and hence to DM419 and the gates PSG411, PCG416 and suppresses RP1 in the gate PSG409 whenever RP1 appears on two and only two of the leads PL111-5. Thus the register pulse train appears on PL419 whenever the received digit is coded correctly on PL111-5 but not otherwise. PL419 is connected to gates PCG414 and PCG417 and suppresses gate PSG415. Gate PCG417 is opened by the pulse XP403 and applies the third input to gate PCG414 which applies the pulse trains of all registers receiving V. F. signals converted to correctly coded digits to TD414 where these pulse trains are stored so long as they continue to be applied to leads PL111-5. The output of TD414 is applied to gate PCG411 to which is also applied the pulse XP404.

Pulses XP403 and XP404 are each somewhat longer than 1400 microseconds so as to gate all combinations of the 14 position pulse trains and the 99 register pulse trains and the interval between XP403 and XP404 is made greater than the longest period for which it is probable, that a correctly coded signal can be imitated by noise. XP403 can recur close after XP404 provided that they do not overlap. Thus, after a correctly coded digit has persisted for a time sufficient to exclude the probability that it results from noise, the pulse train of the register receiving it is applied by gate PCG411 to lead PL411 which indicates that a digit has been received. Pulse lead PL411 is also applied to gates PCG410 and PCG416. If the first digit received by a register consists of the register pulse train on leads PL113, PL114 and PL115 the gate PCG421 emits the register pulse train on PL421 which is applied to PCG410 which therefore produces the register pulse train on PL410 indicating that the call originated from a Calling Manual Board. If the digit received consists of the register pulse train on two of the leads PL111-5, gate PCG416 is stimulated by the register pulse train appearing on leads PL411, PL418 and in combination with a position pulse train on lead PL412, and stimulates gate PSG422 which allows the combination of the register pulse train and position pulse train to be applied via PL422 to gates PCG401-5. The register pulse train on leads PL111-5 is thus applied via decoupling means DM401-5 to the correct position in the digit store TD401-5.

If an incorrectly coded digit is presented to the main store of a register on pulse leads PL111-5, the register pulse train is gated through PCG415 by the pulse XP401 to the gate PSG415 which is not suppressed. Gate PSG415 applies the pulse trains of all registers receiving V. F. signals converted to incorrectly coded digits to TD415 where they are stored so long as they continue to be applied to leads PL111-5. Pulses XP401 and XP402 are each somewhat longer than 1400 microseconds and the interval between XP401 and XP402 is such that if an incorrectly coded digit persists for longer than this interval the pulse train of the register to which it is applied is gated through PCG409 onto pulse lead PL409 to give an N. U. indication. XP401 can recur close after XP402 provided that they do not overlap.

If a register is receiving dial impulses and not V. F. signals its pulse train is not present on PL109 so that it cannot be applied to TD414 or TD415. Also the pulse train of this register is not suppressed in gate PSG411 or by PL109 in gate PSG409. Therefore pulse lead PL411 receives the pulse train of this register from PL418 to indicate that a digit is being received correctly and to apply to gate PCG416. Thus the pulse trains of all registers receiving dial impulses as correctly coded digits on two of the five leads PL111-5 appear on pulse leads PL418 and PL411 and permit these register pulse trains combined with the appropriate position pulse trains appearing on PL412 to be gated through PCG416 and PSG422 to PL422 so permitting these digits to be stored in TD401-5. The pulse trains of these registers are suppressed in the gate PSG409 via PL418.

The pulse train of a register receiving dial impulses converted to incorrectly coded digits appears on the output of DM415 and is applied to gate PSG409, where it is not suppressed as it does not appear on PL418, and thence to PL409 giving an N. U. indication for this register. This condition might arise due to a fault.

Whenever a register is seized its pulse train is applied by the selector for a few milliseconds to pulse indicating lead PIL101. This lead and the position pulse train PP1 are applied to gate PCG412 which applies the combination of the register pulse train and PP1 via the gate PSG412 to the time delay device TD412, where this combination of pulse trains is stored. Hence the pulse train of each register in use is stored in combination with only one appropriate position pulse train in TD412 and appears on lead PL412. Pulse lead PL412 is applied to gates PSG412, PSG413, PCG416, PSG419 and PCG406 via DM406. Whenever a correctly coded digit appears on leads PL111-5, the appropriate combination of register pulse train and position pulse train is gated from PL412 through PCG416 and PSG422 which applies it to the gates PCG401-5. The digit is therefore stored via DM401-5 in TD401-5 in the position allocated to it by the pulse train stored in TD412. As soon as the digit appears on the output leads PL401-5 of the devices TD401-5 its pulse train is applied to gate PSG423 which is being suppressed by the pulse trains on PL422.

As soon as the digit disappears from PL111-5 and thus from PL422 it is no longer applied to TD401-5 but continues to circulate in TD401-5 via the gates PSG401-5 and the decoupling means DM401-5 respectively. The pulse train of the digit therefore appears on the output of gate PSG423 and is applied via PL423 to PSG413 and DM466, and suppresses PSG422. The same pulse train on PL412 is gated through PSG413 and is applied to TD413 and suppresses PSG412. That pulse train is therefore removed from TD412, and delayed by TD413 so as to coincide with the position pulse train used to identify the next digit, and appears on PL413. This is applied via PSG412 to TD412 and stored to provide on PL412 the pulse train of the register concerned combined with the position pulse train appropriate to the next digit to be received by this register. Thus every time a pulse of a register pulse train applied to pulse lead PL423 coincides with a pulse of the combination of that register pulse train with a position pulse train appearing on PL412 that register and position pulse train combination is shifted in TD412 so as to coincide with the next position pulse train. If a digit is eventually stored in TD401–5 in the position of PP11, the register pulse train in combination with PP11 is applied via PSG423 to PL423 but is suppressed by PP11 at PSG413 so that no further shifting can occur. TD412 continues to store the register pulse train in combination with PP11 but no further digit can be stored as PSG422 is suppressed over PL423 at position PP11 for this particular register.

Whenever a register and position pulse train combination stored in TD412 is shifted to coincide with a pulse of PP7, this pulse train combination applied via PL412 and DM406 to PCG406 is gated onto PL406, which indicates to a selector these registers whose stored information awaits translation. The operation of the translator will be described later but it may erase any part of the code stored in TD401–5 by applying the appropriate pulse train combinations via PL486 to suppress the gates PSG401–5 and in the place of the erased part of the code the translator may insert a translation in TD401–5 via PL481–5 and DM401–5. The translation and the remainder of the code stored in TD401–5 is later transferred to the marker over PL401–5, when all the incoming information necessary to start setting up the connection in this exchange has been stored. When a further digit is stored in TD401–5 in the position of PP7 the pulse train combination on PL412 is shifted to the position of PP8 but the pulse train combination of the stored digit is then applied over PL423 via DM406 to PCG406 and continues to produce on PL406 the register pulse train in combination with PP7.

Unit U43 provides certain facilities which are examples of special requirements for non-director exchange working.

If the first digit stored in TD401–5 is the prefix for a national long distance call P2 (digit "0") then the pulse train of the register in combination with PP1 will appear on PL402 and be gated through PCG432 by PP1 and passed via DM432 to be stored in the 100 microsecond time delay device TD432. The output of TD432 is applied over PL432 to the gate PCG439 and to suppress the gates PSG438 and PSG433. The pulse train of the register will not appear on PL403 or PL404 or PL405 in combination with PP1 so that there is no further effect within unit U43. Provided that the register pulse train is not applied to PL125 the digits are stored in the digit store until the register pulse train in combination with PP7 appears on PL412—i. e. until six code digits have been stored—and then the translator is selected over PL406.

If the first digit stored in TD401–5 is the local dialling prefix P1 (digit "8"), then the pulse train of the register in combination with PP1 will appear on both PL402 and PL403 and be gated through PCG431 by PP1 and passed via DM431 to be stored in the 100 microsecond time delay device TD431 as well as stored in TD432 as previously described. The output of TD431 is applied over PL431 to the gates PCG433 and PSG433 and suppresses the gate PSG438. PSG433 is suppressed by the register pulse train on PL432 but PCG433 allows the pulse trains PP5 and PP6 to pass over leads PL433 and PL423 to PSG 413. Thus, after the fourth code digit has been stored in TD401–5 and the register pulse train is stored in TD412 in combination with PP5, the pulse trains PP5 and PP6 are gated through PSG413 and two successive shifts of the pulse train combination stored in TD412 occur. The register pulse train will then appear on PL412 in combination with PP7 so that the next digit received is stored in this position and the translator is selected via PCG406 and PL406.

If the register pulse train appears on PL125 indicating that P1 and P2 calls are bared to the subscriber and the subscriber dials P1 or P2, the register pulse train is gated through PCG439 to lead PL409 which indicates that N. U. tone is required.

The subscriber is thus prevented from obtaining calls to which he is not entitled.

If the first digit to be stored is the special services prefix digit "9," the register pulse train appears on PL403 in the position PP1 and is stored in TD431 and not in TD432. The output of TD431 on PL431 is applied to PCG433 and to PSG433 which is not suppressed and suppresses PSG438. Thus the pulse trains PP3, PP4 applied to PSG433 and the pulse trains PP5 and PP6 appear on PL433 and on PL423. After the second digit is stored in TD401–5, four successive shifts of the pulse train combination stored in TD412 occur and the translator is selected as described above. An N. U. indication is not given to a barred P1 and P2 subscriber who dials the first digit "9."

If the first digit stored in TD401–5 is a numerical digit 1–7 the register pulse does not appear on PL402 or PL403 and so is not stored in either TD431 or TD432. It does, however, appear on either PL404 or PL405 and is applied via DM437 to the gate PCG437 which it is gated through at the time of the pulse train PP1 onto lead PL407, and indicates that the call is to be charged at unit fee. The gate PSG438 is not suppressed so that after the third digit is stored in TD401–5 and the combination of the register pulse train and PP3 is applied to TD413 to produce a shift of the pulse train combination stored in TD412, a single pulse of the combination of the register pulse train and PP4 appears on PL413 and is gated through PSG438 by the pulse train PP4 to the pulse lead PL408 which inserts this pulse into the start setting up timing device. This permits the stored information to be applied to the marker as soon as the fourth numerical digit is stored.

Unit U44 provides certain facilities as examples for director exchange working, where unit U43 is not required. When operating in a director system a translation is normally required, after three code digits have been received. The position pulse trains PP4, PP5 and PP6 are applied to the gate PSG443 in unit U44 and normally pass through this gate over pulse leads PL433 and PL423 to the gate PSG413. After the third digit is stored in TD401–5, three successive shifts of the pulse train combination stored in TD412 occur, and the translator is selected as previously described.

If the first digit stored in TD401–5 is "0" requiring routing to the manual board without the receipt of any more digits, this digit will appear as the combination of the register pulse train and PP1 on leads PL401 and PL402, which leads are connected in unit U44 to gate PCG441 together with the pulse train PP1. Pulses of the register pulse train are therefore applied via DM441 to TD441 in which the register pulse train is stored. The output of TD441 is applied to PCG443 together with the position pulse trains PP2 and PP3. The combinations of the register pulse train with PP2 and PP3 are therefore gated through PCG443 and PSG443 and via PL433 and PL423 to PSG413. Hence, after the first digit "0" is stored, five successive shifts of the pulse combination stored in TD412 occur, and the translator is selected as previously described.

If a class of service signal is received on PL124 indicating that numericals only are to be received and that no translation is required, the signal consisting of the pulse train of the register, the gate PSG443 is suppressed. After the third digit is stored in TD401–5 and the combination of the register pulse train and PP3 is applied to TD413 to produce a shift of the pulse train combination stored in TD412, a single pulse of the combination of the register pulse train and PP4 appears on PL413 and is gated through PCG448 by the register pulse train on PL124 and PP4 to the pulse lead PL408. As in the non-director case, this permits the output leads of the store to be connected to the marker as soon as the fourth numerical digit is stored.

The operation of the translator to perform the above mentioned functions will now be described with reference to U45 as shown in Fig. 1B. Clearly the translating functions may be performed in other ways and this is described only by way of example.

As already described, the translator selects one of the registers indicating that its stored information awaits translation. When the translator U45 selects a register and obtains a translation for it, the translated information is presented to the common control on leads using the pulse trains of the selected register. The information derived in the translator will now be described for this embodiment.

If an invalid code is received, the indication that N. U. tone should be returned to the calling circuit appears on PL456 which together with PL130 from the main store is connected to PL136 which is the operating lead of timing device TD114 which stores the register pulse trains of those registers for which N. U. tone must be returned to the calling circuit. If the call is to be made to a manual board, this is indicated on PL451 which is connected as an operating lead to TD116 which indicates on its output lead PL141, those registers controlling calls to manual boards. The charge for the call is indicated on PL452 using position pulse trains PP1, PP2, PP3, PP4 and PP5 which here represents 1, 2, 4, 8 unit fees and timed metering so that any fee from 0–15 units is permissible using either timed or untimed metering. PL452 is connected together with PL407 from the main store to lead PL137 which is the operating lead of 1400 microsecond timing device TD117 which stores the metering information for all the registers. If the digits received by the translator indicate that a junction or a manual board route out is required this is indicated by an individual binary code using a number of pulse positions on the two leads PL453 and PL454. In this embodiment the pulse positions used are quite arbitrarily chosen to illustrate the point and it will be referred to again later in a section dealing with the economics in the number of timing devices required. The arbitrarily allocated position pulses used to indicate the junction and manual board routes out are PP7, 8, 9, 10 on lead PL453 and PP8, 9, and 10 on PL454 giving $2^7-1$ possible routes out. Clearly more or less could be used and codes other than binary would be practicable. PL453 and PL454 are the operating leads of 1400 microsecond timing devices TD118 and TD119 respectively and the route out is indicated on their output leads PL143 and PL144 using the position pulse trains already mentioned. The number of digits required to have been received by the register in the main store before the marker can set up the call through the exchange is indicated on PL455 which indicates by the position pulse of the digit required to be received before the marker can be brought into use. PL455 is connected together with PL408 from the main store U40 to PL138, the operating lead of 1400 microsecond timing device TD120. If the route out is a junction this is indicated by the appearance of the register pulse train on lead PL471 which is the operating lead of timing device TD113 which stores the pulse trains of those registers controlling connections to junctions. If the connection is to an electromechanical exchange, this is indicated on PL472 which is the operating lead of TD112. If the call is made over a junction certain digits in various pulse positions in the main store must be transmitted over the junction and the pulse positions of these digits to be sent are indicated on PL473 connected to the dial impulse and V. F. senders U60 and U55. If the translator has no fee information but the call is to be charged for by an amount dependent upon the information to be derived in the next exchange, this is indicated on PL474, connected to PCG151 to which PL132 is also connected so that only if the call is to be charged for is the pulse train transmitted to the operating lead of timing device TD121. The pulse train of the register selected by the translator is indicated on PIL453 connected to U55 indicating to the V. F. sender that it is shortly required to send V. F. signals over the called circuit. If the digits in the main store are required to be modified for routing the call through tandem director exchanges for example this may be done using the leads PL481, PL482, PL483, PL484 and PL485 on which new digits may be read into the main store and PL486 which is used to delete the existing information either wholly or in part as required. Having performed a translation for a register, the translator may be released and used for another register. These examples of the information which may be derived from the translator may be added to in practice. For example it would be possible to indicate whether or not an alternative route was available over which the marker could try to set up the call if its preferred route attempt were unsuccessful.

The translator will now be described in more detail with reference to Figs. 9A and 9B arranged as shown in Fig. 13.

The register pulse trains of those registers which require connection to the translator pass from the store unit U40 on pulse lead PL456 which is connected to pulse suppression gate PSG451. (PSG451 will not be inhibited by pulses on its inhibiting connection PSL451 if the translator has not been seized by a register.) Assuming that the translator is free, pulse trains on input lead PL456 will be connected to lead PIL 451 and to the register selector RS451, which may be a selector as described in U. S. patent specifications No. 2,727,094 granted to T. H. Flowers, S. D. Harper and L. R. F. Harris or U. S. patent application Serial No. 404,740 in the name of L. R. F. Harris and will select one and one only of the applied pulse trains, which selected pulse train will be caused to appear on its pulse output lead PIL453. PIL453 is connected to the pulse coincidence gates PCG451, PCG452, PCG453, PCG454, PCG455 among others. PIL453 is also connected to the pulse storage device TD451, which may, for example, be a mercury delay line. The pulse train of the register which has seized the translator is thus stored in TD451 and will appear on lead PSL451 which is connected to pulse suppression gate PSG451. The pulse train of the seizing register still appearing on PL456 is thus prevented from appearing on lead PIL451 and is thus prevented from being re-selected by RS451 until the coincident pulse train has been erased from the storage in TD451 as will be described later. This arrangement prevents any register, having once been connected to the translator, from obtaining a translation more than once before that register itself has been released on completion of the connection. Digital information from the main store will appear in the form of pulse train on the pulse leads PL401, PL402, PL403, PL404 and PL405.

These pulse trains will be those appropriate to any or all of the registers in use at the time and are applied to the pulse gates PCG451, PCG452, PCG453, PCG454 and PCG455. These pulses appropriate to that register which has been selected by RS451 will coincide in time with the pulse train on PIL453 which is also connected to the gates PCG451–455 inclusive and will pass through them onto all or any of pulse leads PL461, PL462, PL463, PL464, and PL465. These five pulse leads carry the coded stored digital information and are connected through $n$ groups each of five pulse coincidence gates to $n$ groups each of five triggers. Thus PL461 is connected via gate PCG 481 to trigger TR481, via PCG486 to TR486, via PCG491 to TR491, via PCG496 to TR496, via PCG501 to TR501, and via PCG506 to TR506 and so on. In this example a two out of five digital code is used and a group of five triggers is provided for each digit to be staticised and $n$ is equal to six so that the six groups of triggers permit a maximum of six digits from the main store to be staticised as will be explained. The first digit to be extracted from the main store is represented by pulses on two of the five leads PL401–405 inclusive occurring at such a time as to coincide with pulse train PP1 of the position pulse trains and also with that pulse train out of the register pulse trains which corresponds to the register which has seized the translator. The pulses appearing on PL461–465 inclusive are only those coinciding with the pulse train of the seizing register which has been made to appear on PIL453.

Leads PL461–465 inclusive are connected to, among others, pulse coincidence gates PCG481–485 inclusive to which the pulse PP1 is applied. The outputs of gates PCG481–485 inclusive, are pulse leads PL481–485 inclusive respectively, and pulses will appear on those leads and only those leads out of PL481–485 inclusive which originate on pulse coincidence gates which are connected to those of leads PL461–465 inclusive which have on them pulses coincident in time with PP1. Leads PL481–485 inclusive are connected to triggers TR481–485 inclusive respectively of which those having pulses applied to them will be operated. Assuming, as above, that the first digit to be staticised is represented by a pulse on each of two of the five leads PL461–465, the corresponding two triggers out of TR481–485 inclusive will be operated. Similarly pulses representing the second digit will appear on leads PL461–465 inclusive coincident in time with PP2 and will pass any of gates PCG486–490 inclusive to which they are applied and will operate the appropriate two triggers out of TR486–490 inclusive. In this manner up to six digits in the arrangement described may be staticised on six groups of five triggers, two out of each group being operated. Operation of each trigger is indicated by a condition of the appropriate lead out of DCL481–510 inclusive which is connected to it, each group of five leads may have two leads so marked, the two marked leads may be selected in ten different ways. Consider first the case where a translation is required for a code consisting of the maximum number of digits, six. Two triggers in each group will be operated so that twelve of the leads DCL481–510 inclusive will be marked. In the case shown in Figs. 12 and 13 these leads are:

In the 1st group DCL481 and DCL482
In the 2nd group DCL487 and DCL489
In the 3rd group DCL494 and DCL495
In the 4th group DCL497 and DCL500
In the 5th group DCL501 and DCL505
In the 6th group DCL506 and DCL 508

The marked leads are then combined in pairs, DCL481 and DCL482 for example are connected to the D. C. gate DCG451 which will produce an output on lead DCL509 when both are energised. Similarly an output is produced on DCL510 when, and only when, DCL487 and DCL489 are both marked. Leads DCL509 and DCL510 are connected to the gate DCG457 which will then give an output on DCL515 when and only when DCL481, DCL 482, DCL487 and DCL489 are simultaneously marked. Similarly an output is produced on lead DCL516 when, and only when leads DCL494, DCL495, DCL497, and DCL500 are marked simultaneously. Leads DCL515 and DCL 516 are connected to DCG 460 which will then produce an output on DCL517 when and only when all eight leads DCL481, DCL482, DCL487, DCL489, DCL494, DCL495, DCL497 and DCL500 are simultaneously marked. Similarly DCG459 produces an output on DCL518 when, and only when, DCL501, DCL505, DCL506 and DCL508 are simultaneously marked. DCL517 and DCL518 are similarly connected to gate DCG451 which will then produce an output on DCL519 when, and only when, the twelve leads DCL481, DCL482, DCL487, DCL489, DCL494, DCL495, DCL497, DCL500, DCL501, DCL505, DCL506 and DCL508 are simultaneously marked, and such output is unique to the particular combination of digits forming the code sent into the translator from the main store and which caused those particular triggers to be operated.

In a similar manner every code from which a translation may be required has a unique D. C. lead associated with it which is energised when, and only when, those triggers appropriate to that code have been operated. Clearly this tree of gates may be arranged in a number of ways and this one has been described by way of example. It will in general be necessary to obtain translations for codes have less than the full number of six digits, for example in an area corresponding to an existing director area it will be necessary to route a call to manual board on receipt of the single digit "0" and to route to any other exchange in the area on receipt of the three digits corresponding to the first three letters of the exchange name. Also, use of these digits as single digit or three digit codes must not prevent the use of the same code or codes as the first digit or first three digits of codes consisting of a greater number of digits and so on. For example, the lead DCL509 energised when triggers TR481 and TR482 are operated, is connected to DCG457 as previously described, because the digit they represent is the first digit of the six-digit number considered, but it is also connected via the suppression gate DSG451 to the output lead DCL520.

Suppose, for example, that the triggers TR481 and TR482 are operated when digit "0" is the first digit extracted from the main store for the register which has been associated with the translator. The output lead DCL520 will then be energised unless the lead DCL521 connected to an inhibiting input of DSG451 is also energised, and the marking of DCL520 might be used to indicate that the call is to be routed to the manual board. However, gate DSG451 has inhibiting connections to it from a number of leads, for example DCL510, through suitable decoupling means. One at least of those leads will be energised if further digits are extracted from the main store and staticised on further groups of triggers and if those digits, when preceded by the digit "0" already staticised, form a translatable code. In the latter case an inhibit connection on gate DSG451 will be energised and the marked condition removed from lead DCL520, and when sufficient digits have been staticised some other output lead, DCL519 for example, will be energised in place of it. Thus every recognisable code will eventually be indicated by energising one and one only of the D. C. output leads, such as DCL519 and DCL520 for example, and it is required to convert this indication into the appropriate translated information. The digital part of this information may take two forms, it may be sufficient to indicate by suitably timed pulses that the information in certain digit positions already in the main store is to be transmitted to another exchange to further the setting up of the call, or it may be necessary to delete certain digits of that information and replace them by the correct translation digits in the form of pulses occurring at appropriate times. Some other information is also required in the form of combinations of pulses and this includes indications of junction routes or routes to manual board to which the call is to be connected, indication of the fee to be charged, and instruction to start setting up the call in this exchange. Other supervisory instructions are given by connecting the pulse train of the register which has seized the translator to the pulse lead appropriate to that instruction. These include the instructions that "a manual board is being called," "a junction is being called," "a Strowger exchange is being called" and "the fee to be charged is not known in this exchange and must be found in another exchange nearer the final destination of the call." These instructions enable the appropriate supervisory equipment to be associated with the call. It is arranged that the last instruction above "fee wanted" is never given on the same call as "Strowger exchange called" as such an exchange is obviously unable to determine and signal back metering information.

Coded pulse translations are obtained from the multiplexes MX451–461 inclusive which may be signalling multiplexes as described in U. S. patent specification No. 2,727,094, granted to S. D. Harper and L. R. F. Harris or in U. S. patent application Serial No. 404,760 in the name of L. R. F. Harris. Each multiplex contains up to fourteen pulse gates to each of which one of the fourteen position pulses PP1–PP14 inclusive may be connected. The outputs of the gates are all connected to a common pulse lead, for example PL501 from multiplex MX451. Now by connecting any of these pulse gates to, for example, DCL519 the appropriate pulse trains PP1–PP14 inclusive may be made to appear on PL501 when DCL519 is energised as required to compose the translation information desired which may be varied by connecting to different gates.

The connections from different D. C. code leads such as DCL519 to a given pulse gate in a multiplex are made in such a way that the code leads are effectively decoupled one from another. The pulse leads such as PL501 are connected to pulse coincidence gates such as PCG458 to which are also connected lead PIL453 on which, as already described, the pulse train of the seizing register is caused to appear. Pulses therefore appear on the output pulse leads, such as PL452, coincident in time with the position pulses selected in the multiplex, such as MX451, according to the connections made to it (from DCL519 for example), and also coincident with the pulse train of the register. For example, the fee to be charged for the call is indicated by combinations of pulses on lead PL452, these pulses being in time coincidence with all or any of the position pulse trains PP1, PP2, PP3, PP4 or PP5, and with the pulse train of the seizing register. In the embodiment described for example, a pulse coincident with PP1 is used to indicate a charge of unit fees, coincident with PP2 two unit fees, coincident with PP3 four unit fees, coincident with PP4 eight unit fees. By combinations of these pulses from one to fifteen unit fees may be indicated. The presence or absence of a pulse coincident with PP5 indicates that the call is or is not to be timed for charging purposes.

The positions in the main store of the pulses representing the digits which it is required to transmit to another exchange are indicated by connection of the appropriate positon pulses out of PP1–PP14 inclusive to lead PL473 via PCG463 and multiplex MX461 to which the appropriate connections are made from the unique code lead such as DCL519 concerned. Also it may be necessary to delete certain specified digits from the information contained in the main store, either in order to allow translation digits to be put in their places or, in the arrangement described here, to prevent more digits than those required from being extracted from the main store by the marker, as described later. The pulse positions of the digits which it is required to delete are indicated by arranging such connections from, for example, DCL519 to the pulse gates in MX460 that the appropriate position pulses appear on lead PL486. Translation digits are similarly produced on pulse leads PL481–PL485 inclusive pulses on any two of which are arranged to appear simultaneously, coincident in time with the appropriate position pulse and with the pulse of the seizing register, by appropriate connections to the multiplexes MX455–MX459 inclusive. As previously explained, each selection of two out of the five leads represents a decimal digit.

The required translation may also contain certain items of supervisory information, each of which is indicated by the connection of the pulse train of the seizing register to the lead particular to that item of information. For example, if the information extracted from the main store which is arranged to cause DCL519 to be energised indicates that the destination of the call is a Strowger exchange DCL519 will be connected to gate PCG465 to which PIL453, on which the pulse train of the seized register is made to appear, is connected. All connections from code leads such as DCL519, DCL520 to gates such as PCG465 are made so as to provide decoupling of each code lead from every other similar lead connected to the same gate. The pulse trains of the seizing register then appears on lead PL472 from PIL453 via PCG465. Gates PCG464, PCG465 and PCG466 are similarly connected to those code leads such as DCL519 which are energised on receipt of information from the main store whose translation includes the instructions "call is to a manual board," "fee to be charged is not known in this exchange and must be found elsewhere" and "call is to a junction" respectively.

A number unobtainable indication is given by the translator if none of the D. C. outputs, for example DCL519, DCL520, has been energised within a predetermined time after a register has seized the translator. When the register selector RS451 selects one of a number of calling registers it causes the pulse train of the selected register to appear on the pulse lead PIL453 as already described and also produces a D. C. indication on lead DCL530 via DCL520. DCL530 is connected to time delay device TD452 which then produces a D. C. output on DCL531 a prearranged time $t2$ after the appearance of the indication on DCL530. DCL531 and PIL453 are both connected to pulse gate PG451 which will pass the pulse train of the seizing register from PIL453 on to lead PL520 when a D. C. signal appears on DCL531. Lead PL520 is connected to the pulse suppression gate PSG452 which will pass any pulses from PL520 onto the "number unobtainable" lead PL456 unless a coincident pulse train is applied to its inhibit connection by pulse lead PL521. All the code leads such as DCL519, DCL520 energised on receipt of translatable codes are connected to pulse gate PCG456 to which PIL453 is also connected. The connections are made so as to provide decoupling between all code leads. Thus when any translatable code has been staticised on the triggers TR481–510 inclusive pulses of the seizing registers pulse train are passed from PIL453 to PL521 via PCG456. These pulses are coincident with those arriving at PSG452 also from PIL453 via PG451 and PL520 and will suppress the latter at PSG452. Thus if the digits of any translatable code have been received in the translator within time $t2$ after its seizure by a register the sending out of the number unobtainable indication on PL456 is prevented, otherwise the pulse train of the seizing register will be caused to appear on PL456 indicating that no translation can be found and that the code in the main store is therefore not valid.

The translator is arranged to disconnect itself from the register which has seized it after a prearranged time $t1$ controlled by the time delay device T451 which is connected to lead DCL530 on which a D. C. indication appears when the register selector RS451 locks to the pulse train of a calling register, as already described. A time $t1$ after DCL530 has been energised a signal is produced by TD451 on lead DCL452 which is connected to an inhibit connection on RS451 which is thereby caused to release and to cease sending out a pulse train on PIL453 and a D. C. indication on DCL530. The gates PCG451–455 inclusive, PCG458–463 inclusive, PCG471–475 inclusive, PG462, PG463, PG464–466 inclusive are then closed and the translator cut off from the rest of the system except by the calling lead PL456. Lead DCL452 is also connected to reset connections on the triggers TR481–510 inclusive which are thus restored to the normal condition at the same time as the register selector RS451 is released. The translator can now be connected to another calling register but the pulse train of the previous register will still be stored in TD451 and will still appear on PSL451 at the inhibiting connection of gate PSG451, so that until TD451 is cleared of that pulse train the previous register cannot re-seize the translator. It is arranged that when each register finally clears, its pulse train is deleted from TD451 and other similar devices by suppression of the appropriate re-timing pulses. The register can then connect to the translator again when it is again brought into use. A given register can thus obtain only one connection to the translator during its association with any one call.

The translated information having thus been stored, the marker may be called in for the register to set up the call through the exchange. The five output leads PL401–405 from the main store are connected via decoupling means DM111 and lead PL135 to pulse coincidence gate PCG108 where the pulse positions of the digits already stored may be compared with the "start setting up" pulse stored in TD120 presented to PCG108 over lead PL145. When sufficient digits have been received by the main store for a pulse to be transmitted from PCG108 to PL146, pulses of the register pulse trains appear on lead PL147 connected to the marker, which indicates those registers whose connections may be set up through the exchange by the marker. On PL147 appear also those pulse trains of registers for which N. U. or busy tone must be returned to the calling circuit. The output of TD114 and TD115 used for these two purposes respectively are connected via decoupling means DM112 together with PL146 to PL147.

When the register is selected by the marker all the information required to set up the connections through the exchange is staticised in the marker U70 as described. The information presented to the marker using register and position pulse trains is as follows:

On PL139 from TD114 and PL140 from TD115 are indicated the registers for which N. U. and busy tone respectively must be returned to the calling circuit. On PL141 from TD116 are indicated the registers for which the connection is to be set up to a manual board. The output of TD117 is connected via PCG109 to which PL132 is connected so that metering information is presented to the marker from the output lead PL142 of PCG109 if metering is required on the connection in this exchange as indicated from TD111 on PL132. PL131 which indicates that the call is from a manual board and that therefore no called subscriber held facility is required on the call, is connected to U70 as are the leads PL143 from TD118 and PL144 from TD119 indicating the junction and called manual board routes out. The five main output leads PL401–405 from the main store are connected to the marker via inhibiting gates in which the register pulses are suppressed if the call is to a junction as indicated on PL143 or to a manual board as indicated on PL141. Both of these leads are connected via suitable decoupling means to the inhibiting gates in each of the five leads from U40 so that only if the call is not to a manual board or to a junction is the main store information presented to the marker.

When the marker is in use by a register, the register pulse train appears upon lead PIL701 which is connected to the pulse coincidence gates PCG110 enabling the calling circuit to be identified as already described—PIL701 also causes the deletion of the pulse train of selected registers from TD120 thus removing the "start setting up signal" and preventing the reseizure of the marker except when N. U. tone or busy tone are to be reverted to the calling circuit. The marker appropriately marks the group of one or more suitable called circuits on leads ML1, ML1$^1$, ML2$^1$ or similar leads whose operation may be as described for ML1 in U. S. patent application Serial No. 471,072 in the name of L. R. F. Harris and associates appropriate supervisory equipment with the connection using leads GML1, GML2 . . . GML9$^1$, GML10$^1$. The functions of leads GML1 . . . GML8 inclusive may be precisely as those described in U. S. patent application Serial No. 436,632 in the name of L. R. F. Harris and GML9$^1$ and GML10$^1$ are similar leads provided for timing metering and called manual board facilities respectively.

Figures 10B, 14:
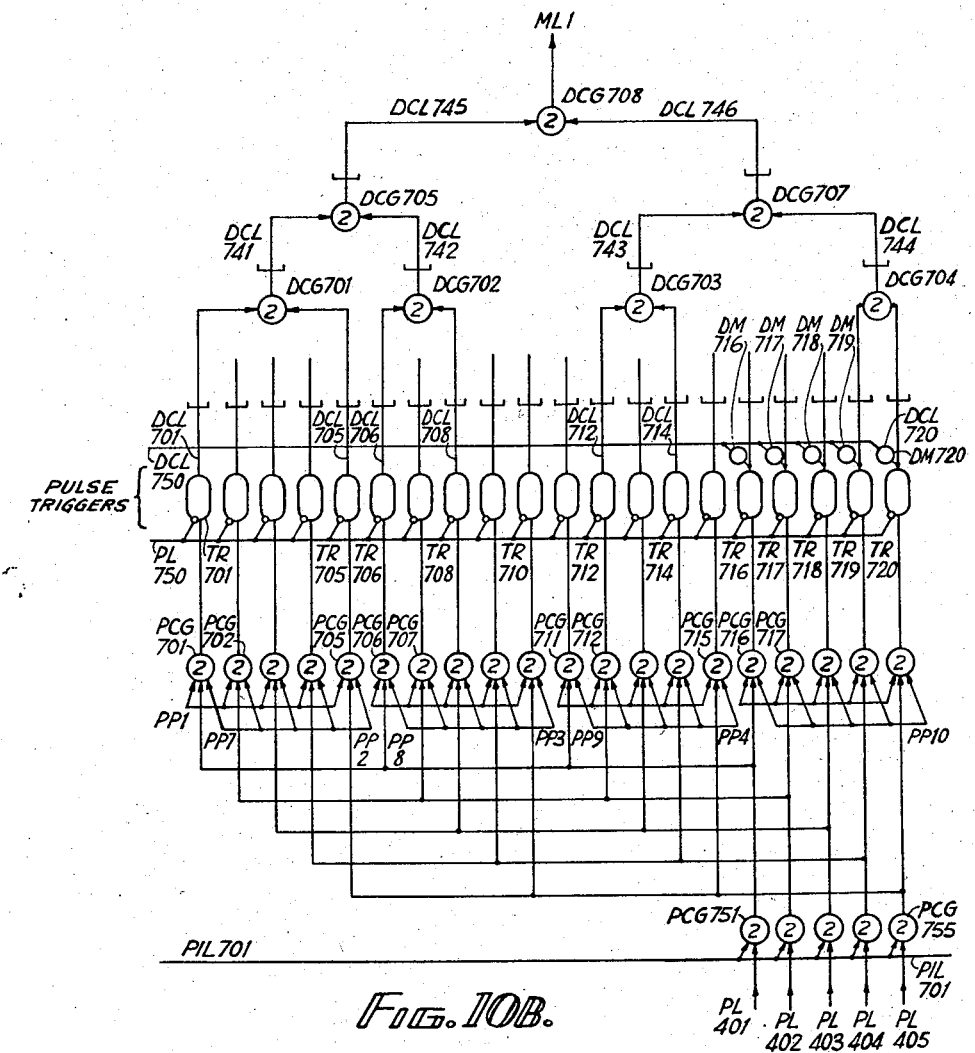

The principal duty of the marker is to accept pulse coded information from the register main store, to staticise that information, to deduce from it to which circuit or circuits it is desired to connect the caller, and to mark them in a suitable manner. It also accepts pulsed meter information and presents it in staticised form on a number of D. C. leads and has certain supervisory functions. The marker will now be described in detail with reference to Figs. 10A and 10B arranged as shown in Fig. 14.

The pulse trains of those registers which require connection to the marker appear on lead PL147 which is connected to the register selector RS701. Like the register selector in the translator this may be a selector as described in the U. S. Patent specification No. 2,727,094, granted to S. D. Harper and L. R. F. Harris or in U. S. patent application Serial No. 404,760 in the name of L. R. F. Harris, one and one only of these pulse trains, which will be caused to appear on pulse indicating lead PIL701. A D. C. indication of seizure is also produced on lead DCL60.

The arrangement shown is designed for use in an exchange having a four-digit numbering scheme. Each digit of a called subscriber's number will appear as pulses coincident in time with the pulse train of the selected register on two of the five leads PL401–405 inclusive. The leads PL401–PL405 inclusive are connected to the pulse coincidence gates PCG751–755 respectively to which PIL701 is also connected. Those pulses on leads PL401, PL402, PL403, PL404 and PL405 which are coincident in time with the selected registers pulse train (which appears on PIL701 as already explained) then pass through the gates PCG751–755 inclusive and are applied to the gates PCG701, PCG706, PCG711 and PCG716 for example in the case of pulses passing through gate PCG751.

Consider the five gates PCG701–705 inclusive which are connected to triggers TR701–705 respectively. To these five gates is connected the position pulse train PP1 for example, so that any pulses which are applied to these gates in time coincidence with pulses of PP1 will pass to the appropriate trigger TR701–705. As explained previously the digit in the first position of the selected registers main store is represented by pulses appearing on two of the five leads PL401–405 coincident in time both with the register pulse train on PIL701 and also with PP1 which is connected to the gates PCG701–705 inclusive and so on. Such pulses will then pass through the appropriate two out of the five gates PCG701–705 inclusive and be applied to the appropriate two out of the five triggers TR701–705 inclusive which will be operated. Since PP2 is connected to the gates PCG706–710 inclusive PP3 to the gates PCG711–715 inclusive, and PP4 to the gates PCG716–720 inclusive then those digits which are stored in positions two, three and four in the selected registers main store will be connected to the trigger TR706–710 inclusive TR711–715 inclusive TR716–720 inclusive respectively as described above in the case of triggers TR701–705 inclusive and the four digits in the first, second, third and fourth positions in the main store will be staticised.

Thus the four digits of a called local subscriber's number which will be stored in position 1–4 inclusive in the main store when the subscriber is called by another subscriber both being on a non-director type of exchange, may be staticised on eight of the twenty triggers TR701–720 inclusive. Under certain circumstances, for example when a local subscriber is called by another exchange, or on a local-local call in a director area exchange, the four digits of the called number will appear not in positions 1-4 inclusive but in positions 7-10 inclusive in the main store. For this reason gates PCG701-705 inclusive have connected to them the pulse train PP7 as well as PP1, PCG706-710 inclusive have PP8 as well as PP2, PCG711-715 inclusive have PP9 as well as PP3 and PCG716-720 inclusive have PP10 as well as PP4 connected to them. When the digits required are in positions 1-4 inclusive there will only have been those four digits dialled into the store and positions 7-10 inclusive will be empty. When the numerical digits are stored in positions 7-10 inclusive it is arranged that the digits stored in positions 1-4 in the main store shall be deleted by suitable timed pulses on lead PL486 from the translator before the marker attempts to staticise them. Thus in either case only the required four digits are staticised.

For each working number a D. C. lead, for example ML1 is provided. This lead is described in U. S. patent application Serial No. 471,072 in the name of L. R. F. Harris and it is necessary to mark the lead uniquely when the combination of triggers corresponding to the number of that line is operated. This is here performed by an arrangement of gates similar to that described in the translator. In the example shown triggers TR701 and TR705 produce an output on leads DCL701 and DCL705 when they are operated. When DCL701 and DCL705 are both marked the gate DCG701 to which they are both connected will mark lead DCL741. Similarly lead DCL742, connected to gate DCG702 will be marked when both TR706 and TR708, whose outputs are both connected to that gate, are operated. Similarly DCL741 and DCL742 are both connected to gate DCG705 (among others), which will then produce an output on DCL745 when, and only when, TR701, TR705, TR706 and TR708 are all operated. Similarly an output will be produced on DCL746 when, and only when, TR712, TR714, TR719 and TR720 are all operated. Leads DCL745 and DCL746 are similarly connected to gate DCG708 which will produce an output on ML1 when and only when both leads are marked i. e. when and only when triggers TR701, TR705, TR706, TR708, TR712, TR714, TR719 and TR720 are all simultaneously operated. Thus an output is produced on ML1 uniquely when the particular combination of triggers corresponding to the subscribers number with which it is associated is operated. As explained previously, information indicating to which junction route (which may comprise a group of junctions to another exchange) or manual board route a call is to be connected may be obtained from the translator in the form of pulse codes. In the embodiment being described this information is passed from the translator on two leads PL453 and PL454 to two storage devices which may for example be mercury delay line stores and from them it may be sent to the marker on the two leads PL143 and PL144. The use of part only of each of two separate storage devices here enables economies in such devices to be made but it is not essential. Junction route and manual board route information will appear as pulses on lead PL143 coincident in time with PP7, PP8, PP9, PP10 and with the pulse train of the selected register, and on PL144 coincident with PP8, PP9, PP10 and with the pulse train of the selected register. Leads PL143 and PL144 are connected to the gates PCG747 and PCG748 respectively. Also connected to those gates is lead PIL701, on which, as already explained the pulse train of the selected register is caused to appear. Those information pulses coincident with the register pulse train then appear on the outputs of PCG747, PCG748 and are thus connected to the groups of gates PCG731-734 inclusive and PCG735-737 inclusive respectively. PCG731 is also connected to PP7, PCG732 to PP8, PCG733 to PP9, PCG734 to PP10, PCG735 to PP8, PCG736 to PP9 and PCG737 to PP10. Thus, for example, a pulse appearing at the output of PCG747 coincident in time with PP8 will pass gate PCG732 and operate trigger TR732. Those triggers out of TR731-737 inclusive corresponding to the pulse information on lead PL143, PL144, appropriate to the selected register will thus be operated, staticising that information. The operated state of any of the triggers TR731-737 inclusive will be indicated by a D. C. output on the appropriate leads of DCL731-737 which are connected to them. As with the subscribers lines each combination of triggers representing a route must be made to mark a particular output lead and that lead only. For example consider the gate DCG709, which has inhibiting connections from DCL731, DCL732, DCL733, and operating connections from DCL734-737 inclusive and will operate only when all four operate leads are energized. The gate will produce an output on ML1¹ if and only if TR731-733 inclusive are all not operated and TR734-737 inclusive are all operated simultaneously. Lead ML1¹ is thus marked uniquely by that particular combination of the triggers and may for example mark a group of junctions, a free one of which is to be connected to the calling circuit. Similarily the gate DCG710 has operating connections from DCL731-735 inclusive and inhibiting connections from DCL736 and DCL737 and will operate only when five inputs are energized. Therefore DCG710 will produce an output on ML2¹ (which may for example mark a particular route to a manual board) only when TR731-735 inclusive are operated and TR736, 737 are not operated, simultaneously. Each possible junction or manual board route out of the exchange may be indicated by a condition on one and one only of a sufficient number of leads such as ML1¹ and ML2¹.

As already explained with reference to the translator the fee to be charged for each call is indicated by a pulse train coincident with the pulse train of the register associated with that call and which appears on the output lead PL452 of the translator and may be stored in a mercury delay line for example. These stored pulses are caused to appear on lead PL142 which is connected to gate PCG745 to which is also connected PIL701 on which the pulse train of the selected register appears. Those pulses of the stored information which are relevant to the selected register are coincident in time with the pulse train of that register and will pass the gate PCG745 and be connected to gates PCG725-729 inclusive. Gates PCG725-729 inclusive have applied to them PP1-5 inclusive respectively. Thus, for example, any pulse on lead PL142 which is coincident in time both with the selected registers pulse train and with the pulse train PP1 will pass both PCG745 and PCG725 and will operate the trigger TR725 which in the embodiment described has been chosen to indicate that one unit fee is to be charged. Operation of trigger TR725 produces a D. C. indication on lead GML5. Similarly triggers TR726-729 inclusive may be operated by pulses on lead PL142 coincident in time with both PP2, 3, 4, 5 respectively and with the pulse train of the selected register. These triggers produce indications on leads GML6, GML7, GML8 and GML9¹ respectively. Indications on leads GML5, GML6, GML7, GML8, and GML9¹ are taken in the embodiment being described to indicate that one unit fee, two unit fees, four unit fees, eight unit fees, are to be charged, and that the call is to be timed for charging, respectively. Thus by suitable combinations of indications on the leads GML5-9¹ inclusive timed or untimed charges of from one to fifteen unit fees may be called for.

The instruction to ring the called line takes the form of a D. C. indication on lead GML3 produced by operation of trigger TR723. This facility will be required in two cases in general, when calling a local subscriber and when calling a manual board, but not when calling a junction. The fact that a local subscriber's line is being called and that ringing will be needed is indicated by a D. C. condition on lead DCL750 which is connected via decoupling means DM716 to trigger TR716, via DM717 to TR717, via DM718 to trigger TR718, via DM719 to trigger TR719, and via DM720 to trigger TR720. Whenever a subscriber number has been staticised two out of the five triggers TR716–720 inclusive will have been operated, and a D. C. condition is thus applied to DCL750 via the appropriate two decoupling means. Lead DCL750 is connected to lead GML3 via decoupling means DM723. Also connected to lead GML3 via decoupling means DM723 is the output of the trigger TR723 which may be operated by pulses on lead PL141 coincident in time with the pulse train of the selected register appearing on lead PIL701. Such pulses pass through gate PCG744 to which both PL141 and PIL701 are connected and operate trigger TR723, thus producing a D. C. condition on lead GML3 similar to that produced by the energisation of lead DCL750. Pulses are caused to appear on lead PL141 when a manual board is being called, so that in both this case and when a local subscriber is called, an indication that ringing will be needed is produced on lead GML3. Lead DCL750 is also brought out to indicate to the supervisory equipment that a local number has been staticised and that calling party release facility will be required in dealing with the call. Calls other than to a local subscriber do not require this facility.

The marker is also informed, by pulses coincident with the pulse train of the calling register on lead PL131 when the call is being originated by a manual board, in order that a "called subscriber held" alarm may be prevented from operating. Lead PL131 is connected to gate PCG746 to which lead PIL701, on which appears the pulse train of the selected register, is also connected. The appropriate pulses, if any, therefore pass through PCG746 and operate the trigger TR730, which applies an indication to lead GML10¹ to which it is connected.

It may be necessary to arrange for a "number unobtainable" indication to be transmitted either when an attempt to connect to a local subscriber, junction or manual board route proves unsuccessful because the code staticised does not correspond to any actual line, or when a distant called exchange reverts a "number unobtainable" signal. When any line (local, junction or manual board) outgoing from the exchange is marked by the marker as being called, a D. C. indication of that fact is produced on lead DCL61 as described in U. S. patent application Serial No. 436,632 in the name of L. R. F. Harris which is connected to the inhibiting connection gate DSG701. If the market has set up to a spare code having no actual line associated with it, no such indication appears on lead DCL61.

As already described lead DCL60 is energised by register selector RS701 when the marker is connected to a register, and after a delay provided by time delay device TD701—DCL751 will be energised. Lead DCL751 is connected to the gate DSG701, so that unless an indication that a working line has been marked has appeared via DCL61 on the inhibit connection of that gate, lead DCL754 and lead DCL757 will be energised by it, producing a number unobtainable indication on lead GML2. An indication that a remote exchange has signalled back "number unobtainable" appears on lead PL139 as pulses coincident with the pulse train of the selected register. Lead PL139 is connected to gate PCG742 to which PIL701 is also connected. Pulses appropriate to the selected register therefore pass gate PCG742 and operate trigger TR721 to which it is connected, producing an output on lead DCL721 and thus on DCL757 and lead GML2, to which it is connected. Lead GML2 is thus energised if "number unobtainable" is to be given for either of the two reasons given above.

The "busy" condition may arise in general in three ways, when the called line (subscribers line or junction route) is busy, when it is impossible to complete the connection through the exchange (exchange busy), or when a "busy" signal is reverted from a called exchange.

As already described, lead DCL is energised on connection of the marker to a register, and is connected to the time delay device TD702, which after a suitable time energises lead DCL752, which is connected to gate DSG702 which will produce an output on lead DCL755 unless its inhibiting lead is energised by a signal on lead DCL62, which signal only appears when a free line has been marked as described in U. S. patent application Serial No. 436,632 in the name of L. R. F. Harris. Thus if the line or lines marked are busy no signal will appear at the inhibiting lead of gate DSG702 and a signal will appear on lead DCL755 which is connected to lead DCL758, at a time controlled by TD702 after seizure of the marker. As explained in U. S. patent application Serial No. 471,072 in the name of L. R. F. Harris it is necessary for one of certain sets of conditions to be fulfilled before a connection can be made through the exchange between a given calling and called line. If a connection is possible a signal will appear on one or more of leads PLM14, PLM15, PLM16, PLM17 and PLM20 which are connected via decoupling means DM703 to lead DCL765 which is connected to the inhibiting lead of gate DSG703. Lead DCL60 is connected to DSG703 via the time delay device TD703 and lead DCL753 which will be energised at a time governed by TD703 after seizure of the marker has been indicated on DCL60. Then, unless a signal to the effect that connection through the exchange is possible has been imposed on the inhibiting lead of gate DSG703 as above, a "busy" indication will be passed by gate DSG703 via lead DCL756 onto lead DCL758. When "busy" is reverted by called exchange pulses coincident in time with the pulse train of the selected register are caused to appear on lead PL140. Lead PL140 is connected to gate PCG743 to which PIL701, on which the pulse train of the selected register is caused to appear, is also connected. Such pulses are therefore passed by PCG743 via lead PL743 to trigger TR722, and the trigger is operated; producing an output on DCL722 which, together with leads DCL755 and DCL756 is connected to lead DCL758 which in turn is connected to the "busy" indicating lead GML1. That lead is thus energised whenever the called line is busy, the exchange is busy (i. e. no means of establishing the connection through the exchange are available) or when a called exchange reverts a busy signal.

In the event of "number unobtainable" or "busy" conditions arising, it is required to disconnect the register from the caller after a suitable time delay so that it may be made available to other callers without waiting for the original caller to clear. Leads DCL757, DCL758 which, as already described, are energised to indicate "number unobtainable" and "busy" conditions respectively are therefore connected via decoupling means DM701 to lead DCL 759 which is in turn connected to gate DCG760. Lead DCL60, which is energized when the marker is seized by a register, is also connected to gate DCG760 via time delay device TD704 and lead DCL762. Thus, if DCL757 or DCL758 is energised, DCL760 will also be energised, at a time governed by device TD704 after seizure of the marker. Lead DCL760 is connected to pulse gate PG741 to which PIL701 (on which the selected registers pulse train appears) is also connected. Therefore if DCL760 is energised the pulse train of the selected register from PIL701 appears on lead PL702, the output of gate PG741. As explained, this occurs when "number unobtainable" or "busy" conditions are detected and is used to release the register from the caller.

When the operations involved in setting up the call through the exchange have been completed a pulse train (in general not coincident with that of the selected register) is caused to appear on lead PL22, the arrangement being described in U. S. patent application Serial No. 471,072 in the name of L. R. F. Harris. The lead PL22 is connected to pulse lengthening means PLM701 which produces a D. C. output on lead DCL761 which is connected to the gate PG740 to which lead PIL701 is also connected. Thus the pulse train of the associated register is made to appear on the output lead PL701 of gate PG740 when the connection has been completed.

Lead DCL761 is also connected, via time delay device TD705 and lead DCL763 to a releasing connection on the register selector RS701. The register selector is thus released after a delay controlled by device TD705 after completion of the connection through the exchange. This delay must be greater than one complete cycle of the main store circulation system or 1400 microseconds in the embodiment being described. When the register selector releases the pulse train of the selected register ceases to appear on lead PIL701 and lead DCL60 is de-energised. The device E701 is arranged to emit a pulse on lead PL750 at the time when DCL60 is de-energised and at no other time. Lead PL750 is connected to reset connections on the triggers TR701-723 inclusive and TR725-737 inclusive which are thus reset when register selector RS701 releases. In case an indication that connection is completed should fail to appear on lead PL22 and lead to the release of the register selector a connection is made from lead DCL60 to another releasing connection on register selector RS701 via time delay device TD706. TD706 is made to provide a delay greater than the time for which the marker can ever legitimately be engaged in setting up a call. Thus if it has not previously been released in the normal course of events the register selector will always release and make it possible for the marker to be seized by another register.

If the connection is satisfactorily completed through the exchange, the selected register pulse train appears upon lead PL701 for a period of about 2 milliseconds. If the call has failed and N. U. or busy-tone conditions have been set up, the register pulse train appears upon PL702 and not on PL701.

If the connection is to a local subscriber or to a manual board there is no need in this embodiment of the invention to hold the register although in practice the connections from the called circuit to the register and to the calling circuit could be checked using the common control. Similarly if N. U. tone or busy tone are being returned to the calling circuit there is no need to hold the register any longer. Thus lead PL702 is connected directly to PL116 which is used to release the register, PL701 is connected to PL116 via pulse suppression gate PSG106 to which PL148 is connected. On PL148 appear the pulse trains of those registers controlling connections to junctions and these prevent the transmission of such register pulse trains from PL701 to PL116.

PL701 is connected together with PL149 to pulse coincidence gate PCG107 which transmits the register pulse train on PL701 to PL134 connected to dial impulse sender U60 if the register controls a connection to an electromechanical exchange for which the digital information must be transmitted as Strowger impulses. The dial impulse sender U60 is described in U. S. patent application Serial No. 500,557 in the names of L. R. F. Harris and S. W. Broadhurst, but upon receipt of a registers pulse on PL134 the digits in the positions of the main store, which positions have already been indicated to U60 over PL473 are read out in sequence upon the main store using its main output leads PL401, PL402 . . . PL405, the corresponding number of dial impulse breaks are indicated on lead PL602 which is connected to pulse suppression gate PSG120 in order that the forward hold signal represented by the register pulse train on PL108 can be inhibited to cause corresponding breaks in the receive hold of the called circuit as for example on lead H2 of circuit CT1 of group GP1 of Fig. 2A of the drawings filed with U. S. patent application Serial No. 471,072 in the name of L. R. F. Harris. Associated relay sets may clearly convert this break into suitable signals for transmitting the dial impulse breaks over the junction. If the call is made to an exchange for which V. F. signalling is appropriate the V. F. sender U55 is used. The digits to be sent by a register are transmitted one at a time in response to stop send signals. As already described the digits to be sent from the main store may be preceded by an instruction digit one of which is used here by way of example. The V. F. sender unit U55 will now be described in detail with reference to Fig. 11.

The five timing devices TD553–TD557 are those actually used to store the tones to be sent to the next exchange. Timing device TD551 stores the position of the digits in the main store which are to be sent on and timing device TD552 is used to ensure that the digits are transmitted in the correct order.

When a register is connected to the translator, its pulse train is presented to U55 on lead PIL453 the pulse positions of the digits to be sent on are indicated on PL473 by pulses of the register pulse train coincident with the position pulse trains of the digits to be sent. PL473 is connected as an operating lead to PCG551 via decoupling means DM552 to pulse suppression gate PSG558 in which the pulses may be inhibited by coincident pulses on PL133 if the call is to an exchange for which dial impulse sending is appropriate or by coincident pulses on the output of decoupling means DM559 to which the outputs of timing devices TD553–TD557 are connected so that the presence of a register pulse train on the outputs of any of these delay lines prevents the transmission of the pulses of the register pulse train through PSG558. The output of PSG558 is connected to coincidence gates PCG553–PCG557 to which the main store outputs PL401–PL405 are connected respectively. A position pulse train on the output of PSG558 will be transmitted through the pair of gates PCG553–PCG558 corresponding to the digit stored in the main store in the position pulse and the outputs of these coincidence gates are connected as operating leads to timing devices TD553–TD557. The outputs of PCG553–PCG557 are connected via decoupling means DM558 to PSG551 as an inhibiting lead of TD551 so that the storage of a digit in TD553–TD557 will delete the position pulse train of that digit from TD551.

The outputs of TD553–TD557 are connected via pulse suppression gates PSG559–PSG563 respectively to modulator M551–M555 respectively where the pulses stored in these timing devices are modulated by the 5 V. F. signals for signalling over the junction unless inhibited by the coincident pulses applied to PSG559–PSG563.

All the pulses from PL473 are thus stored in TD551. In general, if the information to be sent is not preceded by an instruction digit, the first pulse on PL473 which gates information into TD553–TD557 will cause a false digit to be stored there, for this digit need not be the first in the correct sequence for the number as a whole. Hence it must be arranged that, in the event of no instruction digit preceding the digital information to be sent, the first digit to be stored in TD553, TD554, TD555, TD556 and TD557 be deleted without its associated pulse being removed from TD551. This is carried out by connecting PIL453 to PSG564 and DM564. The output of DM564 is connected to PSG559–PSG563 as an inhibiting lead and no modulated pulses are transmitted over PL551 to the called junction. The output of PSG564 is connected via DM563 to coincidence gate PCG562 to which position pulse train PP12 is connected so that at time PP12 a pulse is passed via PCG562 into TD552. PSG557 on the output of TD552 is inhibited by DM564, and this inhibition is removed when PIL453 is no longer marked, i. e., when the translator is released, so that, at a time coincident with a pulse of PP12, a pulse is transmitted through PSG557 which removes the false digit from TD553–TD557, There is the possibility that this false digit will be standing at the open PSG559, PSG560, PSG561, PSG562 and PSG563 for a period of 1400 microseconds but this period is considered too short for a connection to have been established after the release of the translator, and for the next register to detect the signal, owing to the "build-up" time of its filters.

The disappearance of the out-put from TD553–TD557 removes the inhibition from PSG558, and the first pulse after PP12 in the pulse train sequence stored in the "read-out" delay line TD551 opens PCG553, PCG554, PCG555, PCG556 and PCG557. The output from these gates inhibits PCG551 via PCG558, causing the position pulse to be deleted. The output from TD553, TD554, TD555, TD556 and TD557 inhibits PSG558 via PCG559 thereby, preventing the next stored pulse opening PCG553, PCG554, PCG555, PCG556 and PCG557, and at the same time operates the appropriate modulators from M551, M552, M553, M554, M555 via the respective gates PSG559, PSG560, PSG561, PSG562 and PSG563. The combined output comprising the register pulse train modulated by the two of the five frequencies corresponding to the digit to be sent, thus appears on PL551.

Referring now to Figs 2A and 2B lead PL551 is connected to PL117, connected to PL107 via decoupling means DM107 and to PSG120 so that the hold pulses on PL108 do not interfere with the modulated pulses on PL117 and thus, the first of the "digits to be sent" which will be a combination of two of the five signalling frequencies will be sent to the called circuit. Also if, in this embodiment, the "fee wanted" instruction is to be sent on as indicated by the generation of the register pulse train by TD121, the first digit will be accompanied by the "fee wanted" tone. The output of TD121 is connected to transmit modulator TM104 in which all the register pulse train stored in TD121 are modulated by fee wanted tone and are transmitted to the called circuit via PL117.

The receipt of numerical signals using a common pool of V. F. receivers in the exchange at the far end of the junction will cause a "stop send" signal to be reverted for example as in units U25 and U65 described in the U. S. patent applications Serial No. 498,376 in the name of L. R. F. Harris. This stop send signal received by a receiver in the common pool of V. F. receivers U30 (Fig. 2) which indicates the receipt of stop send to guard circuit U65 over lead PL303. The prime purpose of the guard circuit U67 is to prevent the V. F. receivers of U30 from being picked up again by any spurious signal within a period after the detection of stop send during which time it is known that no other stop send signal can be received. Its purpose corresponds to that of U65 on the incoming side of the common control. U67 indicates on lead PL651 that stop send has been received and this deletes the pulse train from TD121 if it was stored there. PL651 is also connected to U55 and when a stop send signal is received the register pulse train appears upon PL651 and PSG559, PSG560, PSG561, PSG562 and PSG563 are inhibited via DM564. At time PP12 the stop send signal gates a pulse into TD552 via DM563 and PCG562, while maintaining PSG557 closed. When the pulse train is removed from PL651 the pulse in TD552 is transmitted via PSG557 to delete the coincident pulses circulating in TD553, TD554, TD555, TD556 and TD557 by the inhibition of PSG552, PSG553, PSG554, PSG555 and PSG556.

Since PSG558 will now not be inhibited, another digit may be transmitted as indicated by TD551 and the main store. Again the deletion of pulses from TD553–TD557 at PP12 ensures that the next digit transmitted is the correct one. The digits are sent one at a time until TD551 is cleared.

Should it be required to send an instruction digit, then a lead such as PL129 will be marked by a short burst of the pulse train of the register, prior to the sender making contact with the translator. With PL129 marked PSG554, and PSG555, and PSG556 will be opened and the information stored in TD555, TD556 and TD557. The pulses so stored will be modulated respectively in M553, M554, and M555 before proceeding to the common lead PI551, and will remain circulating in TD555, TD556, TD557 until a stop-send signal is received. The combined output from TD555, TD556 and TD557 opens PCG560, which in turn inhibits PSG564. This is necessary in order to prevent the pulses that appear on PIL453 when contact is made with the translator, entering TD552 and causing suppression of the instruction digit before the receipt of a stop-send signal. At the same time the output from any of TD553, TD554, TD555, TD556 and TD557 inhibits PSG558 via DM559 so preventing any further digit being read into the delay lines while the instruction digit is still circulating.

The V. F. sender is made inoperative, by marking PL133 in the event of sending being required in the form of dial impulses. PSG558 is inhibited, so detaching the V. F. sender from the "read-out" memory, and PSG552, PSG553, PSG554, PSG555 and PSG556 are also inhibited so that the presence of an instruction digit mark will not cause a "whistle" at the output.

Eventually the connection between two subscribers or between two manual boards is completed and the called circuit in the final exchange is rung by the associated supervisory equipment and ring tone is reverted or the called circuit may prematurely answer in which case answer tone is reverted as described in U. S. patent application Serial No. 436,632 in the name of L. R. F. Harris. The receipt of either tone in a V. F. receiver of the common pool U30 causes the associated register pulse train to appear on lead PL116 which as will shortly be described release the register making it free to be used on another call.

The pulse train may also appear on PL116 to release the register as a result of the operation of a number of time out circuits of which two involving TD102 and TD103 are illustrated in Figs. 2A and 2B. If the calling circuit releases the connection before it is established the pulse train is removed from the hold lead PL102 from the calling circuit. The disappearance of pulse trains for a period greater than that due to spurious breaks and dial impulse breaks should release the common control and this may be done using timing device TD102. The output PL108 of TD101 is connected to pulse coincidence gate PCG 103 to which a source of pulses XP101 is conected which lets through pulses of all the register pulse trains on PL108 every 250 milliseconds (say) which operate TD102 unless inhibited by the pulse trains on PL102. Just before each pulse of XP101 a pulse of a second pulse train applied on XP102 transmits the pulses still stored in TD102 through to PL116 to release the register. Thus a pulse train must be stored in TD102 and therefore must be absent from PL102 for at least 250 milliseconds for the register to be released and the consequent removal of forward hold. The time out circuit using timing device TD103 is an overall time out which releases the register some time after it has been seized. It carries out this timing with an accuracy of two to one and uses pulse train XP103 which occurs every 30 seconds (say) and transmits those pulses on PL108 through PCG105 to operate TD103. Just before each pulse of XP103 a pulse of XP104 occurs which transmits those pulses on TD103 to PL116 through PCG102 thus releasing the register. Clearly other timing functions sometimes required of a register may be performed in the common control. For example a time limit could be allowed for a subscriber to start dialling digits after the connection to the register has been made, which if exceeded caused the connection to be released leaving the register free for another connection etc. Also by counting a number of pulses the accuracy of the timing could be made much greater than 2 to 1 as described for U65 and U67 in the specification of co-pending patent application Ser. No. 471,072.

It is arranged that pulses of each register pulse train appearing on PL116 from any of the releasing units coincides with a particular position pulse PP1 say, in pulse coincidence gate PCG104 which operates timing device TD104 which generates the register pulse train for 14 cycles before being released by the next PP1 pulse train. The pulse trains generated by TD104 cause the deletion of the register pulse train from all timing devices in all the common control for example by inhibiting the clock pulses K1 used to maintain the circulation of pulses in delay line timing devices over pulse hold lead PH101. By storing the pulse train in TD104 for 14 cycles the pulse train is deleted from all the pulse positions of the long delay lines.

As described in the introduction to this specification considerable economies in storage apparatus can be made if combinations taken from a group of delay lines are used to store mutually exclusive information relating to a particular register. For example the delay lines used to switch incoming V. F. receivers for use on registers requiring them may also be used as the delay lines used to receive dial impulse break information providing that another timing device is used to indicate in which manner these timing devices are required to function.

Similarly where the information is infrequently required sections of the long delay lines may be associated with the functions here described as being performed by individual delay lines. There are many ways in which this economy of delay lines or timing devices may be carried out. In general it will be necessary to gate the inputs and outputs of the physical timing devices onto leads individual to the functional timing devices described in the aforementioned embodiments so that the information is appropriately operated upon.

I claim:

1. Apparatus for controlling the setting-up of connections between pairs of circuits of a switching system comprising means for allotting to each such connection to be set up a characteristic time in a recurring time cycle, means for receiving signals indicative of information relating to each said connection and retransmitting said signals as pulses occurring simultaneously on a combination of leads interconnecting said signal receiving means with time division multiplex storage apparatus comprising a plurality of pulse storage circuits for storing said pulses which occur at the time characteristic of the connection, translating apparatus connected with said storage apparatus and operating to translate required parts of the stored information into other signals characteristic of said information.

2. Apparatus for controlling the setting up of connections between pairs of circuits of a switching system comprising means for allotting to each such connection to be set up a characteristic time in a recurring time cycle, alternating current signal and dial impulse receiving means, control circuits for said receiving means for causing the reception by said signal receiving means of signals indicative of information relating to each said connection, said signal receiving means being connected to time division multiplex storage apparatus comprising a plurality of pulse storage circuits by a plurality of leads and operating to transmit received signals to said storage apparatus as pulses occurring simultaneously on a combination of said leads at the time characteristic of the connection, translating apparatus connected with said storage apparatus and operating to translate required parts of the stored information and to transmit said translated information into other signals characteristic of said information.

3. Apparatus for controlling the setting up of connections between pairs of circuits of a switching system comprising means for allotting to each such connection to be set up a characteristic time in a recurring time cycle, means for receiving signals indicative of information relating to each said connection and retransmitting said signals as pulses occurring simultaneously on a combination of leads interconnecting said signal receiving means with time division multiplex storage apparatus comprising a plurality of pulse storage circuits for storing said pulses which occur at the time characteristic of the connection, translating apparatus connected with said storage apparatus and operating to translate required parts of the stored information into other signals at least some of which are transmitted to a marker which produces an output characteristic of said translated information, alternating current signal transmitting apparatus and dial impulse sender apparatus for transmitting required parts of said information from said control apparatus.

4. Apparatus for controlling the setting up of connections between pairs of circuits of a switching system comprising means for allotting to each such connection to be set up a characteristic time in a recurring time cycle, alternating current signal receiving means, control circuits for said alternating current signal receiving means, for causing the reception by one of said means of signals indicative of information relating to each said connection, said receiving means being connected to time division multiplex storage apparatus comprising a plurality of pulse storage circuits by a plurality of leads and operating to transmit received signals to said storage apparatus as pulses occurring simultaneously on a combination of said leads at the time characteristic of the connection, translating apparatus connected with said storage apparatus and operating to translate required parts of the stored information into other signals characteristic of said information.

5. Apparatus for controlling the setting up of connections between pairs of circuits of a switching system comprising means for receiving signals indicative of information relating to the connection, modulating circuits for causing said signals to modulate a pulse train the pulses of which occur at a time characteristic of said connection in a recurring time cycle, modulated pulse receiving means for retransmitting said pulses as pulses occurring simultaneously on a combination of output leads from said receiving means, time division multiplex storage apparatus comprising a plurality of pulse storage circuits connected to said output leads for storing said pulses, translating apparatus connected with said storage apparatus and operating to translate required parts of the stored information into other signals characteristic of said information.

6. Apparatus according to claim 1 and further comprising storage apparatus-translator interconnecting control means for controlling the transmission of pulses stored in said storage apparatus to said translator.

7. Apparatus according to claim 1 in which the translator comprises means for staticising information received from the storage apparatus and for marking a lead characteristic of the staticised information, said lead being connected to translation equipment for producing a translation of the staticised information at a time characteristic of the connection.

8. Apparatus for controlling the setting up of connections between pairs of circuits of a switching system comprising means for allotting to each such connection to be set up a characteristic time in a recurring time cycle, means for receiving signals indicative of information relating to each said connection and retransmitting said signals as pulses occurring simultaneously on a combination of designation leads interconnecting said receiving means with storage apparatus for storing said pulses which occur at the time characteristic of a connection, said storage apparatus comprising a plurality of storage circuits for storing and regenerating said pulses which are stored in a combination of said storage circuits characteristic of said information, translating apparatus connected with said storage apparatus and operating to translate required parts of the stored information into other signals characteristic of said information.

9. Apparatus for controlling the setting up of connections between pairs of calling and called circuits in a switching system comprising a class of service signal receiving circuit for receiving signals indicating the class of service of said calling circuit, means for allotting to each connection a characteristic time in a recurring time cycle, means for storing said class of service signals as pulses occurring at said characteristic time means for receiving designation signals relating to said called circuit as pulses occurring simultaneously on a combination of leads interconnecting said receiving means with time division multiplex storage apparatus comprising a plurality of pulse storage circuits for storing said pulses which occur at the time characteristic of said connection, translating apparatus connected with said storage apparatus and operating to translate required parts of the stored information into other signals characteristic of said information.

10. Apparatus for controlling the setting up of connections between pairs of circuits of a switching system comprising means for allotting to each such connection to be set up a characteristic time in a recurring time cycle, means for receiving signals indicative of information relating to each said connection and retransmitting said signals as pulses occurring simultaneously on a combination of leads interconnecting said receiving means with time division multiplex storage apparatus comprising a plurality of pulse storage circuits for storing said pulses which occur at the time characteristic of the connection, translating apparatus connected to said storage apparatus, selecting means for causing said translating apparatus to receive and translate required parts of stored information and relating to one connection only into other signals characteristic of said information.

11. Apparatus for controlling the setting up of connections between pairs of circuits of a switching system comprising means for allotting to each such connection to be set up a characteristic time in a recurring time cycle, means for receiving signals indicative of information relating to each said connection and retransmitting said signals as pulses occurring simultaneously on a combination of leads interconnecting said receiving means with time division multiplex storage apparatus comprising a plurality of pulse storage circuits for storing said pulses which occur at the time characteristic of the connection, translating apparatus connected to said storage apparatus, selecting means for causing said translating apparatus to receive and translate required parts of information held in said storage apparatus and relating to one connection only, into other signals characteristic of said information, releasing means for releasing said translating apparatus after the latter is caused to receive and translate said information relating to said one connection.

12. Apparatus for controlling the setting-up of connections between pairs of circuits of a switching system comprising means for allotting to each such connection to be set up a characteristic time in a recurring time cycle, means for receiving signals indicative of information relating to each said connection and retransmitting said signals as pulses occurring simultaneously on a combination of leads interconnecting said receiving means with time division multiplex storage apparatus comprising a plurality of pulse storage circuits for storing said pulses which occur at the time characteristic of the connection, translating apparatus connected with said storage apparatus and operating to translate required parts of the stored information into other signals characteristic of said information for marking communication paths to be used for said connections.

13. Apparatus for controlling the setting-up of connections between pairs of circuits for a switching system comprising means for allotting to each such connection to be set up a characteristic time in a recurring time cycle, means for receiving signals indicative of information relating to each said connection and retransmitting said signals as pulses occurring simultaneously on a combination of leads interconnecting said receiving means with time division multiplex storage apparatus comprising a plurality of pulse storage circuits for storing said pulses which occur at the time characteristic of the connection, translating apparatus connected with said storage apparatus and operating to translate required parts of the stored information into other signals characteristic of said information the alternating current signal transmitting apparatus operable in accordance with said other signals for transmitting some at least of said information as alternating current signals.

14. Apparatus for controlling the setting-up of connections between pairs of circuits of a switching system comprising means for allotting to each such connection to be set up a characteristic time in a recurring time cycle, means for receiving signals indicative of information relating to each said connection and retransmitting said signals as pulses occurring simultaneously on a combination of leads interconnecting said receiving means with time division multiplex storage apparatus comprising a plurality of pulse storage circuits for storing said pulses which occur at the time characteristic of the connection, translating apparatus connected with said storage apparatus and operating to translate required parts of the stored information into other signals characteristic of said information and dial impulses sending apparatus operable in accordance with said other signals for transmitting some at least of said information as dial impulses.

15. Apparatus for controlling the setting-up of connections between pairs of circuits of a switching system comprising means for allotting to each such connection to be set up a characteristic time in a recurring time cycle, means for receiving signals indicative of information relating to each said connection and retransmitting said signals as pulses occurring simultaneously on a combination of leads interconnecting said receiving means with time division multiplex storage apparatus comprising a plurality of pulse storage circuits for storing said pulses which occur at the time characteristic of the connection, said storage apparatus comprising storage devices in which different bits of information relating to a connection are stored at different times in a further recurring time cycle, translating apparatus connected with said storage apparatus and operating to translate required parts of the stored information into other signals characteristic of said information.

16. Apparatus for controlling the setting-up of connections between pairs of circuits of a switching system comprising means for allotting to each such connection to be set up a characteristic time in a recurring time cycle, means for receiving signals indicative of information relating to each said connection and retransmitting said signals as pulses occurring simultaneously on a combination of leads interconnecting said receiving means with time division multiplex storage apparatus comprising a plurality of pulse storage circuits for storing said pulses which occur at the time characteristic of the connection, translating apparatus connected with said storage apparatus and operating to translate required parts of the stored information into other signals characteristic of said information, for indicating to connection control apparatus some at least of said information to be used for the subsequent control of the connections.

References Cited in the file of this patent
UNITED STATES PATENTS
2,490,833   Ransom _____ Dec. 13, 1949